United States Patent
Yoon et al.

(10) Patent No.: US 9,615,076 B2
(45) Date of Patent: Apr. 4, 2017

(54) DISPLAY DEVICE, CONTROLLER FOR CONTROLLING OPERATION OF THE DISPLAY DEVICE, AND METHOD FOR OPERATING THE DISPLAY DEVICE

(71) Applicant: Samsung Display Co., Ltd., Yongin, Gyeonggi-do (KR)

(72) Inventors: Il Yong Yoon, Seoul (KR); Ji Hoon Kim, Seoul (KR); Se Huhn Hur, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 61 days.

(21) Appl. No.: 14/456,911

(22) Filed: Aug. 11, 2014

(65) Prior Publication Data

US 2015/0172622 A1 Jun. 18, 2015

(30) Foreign Application Priority Data

Dec. 13, 2013 (KR) .................... 10-2013-0155782

(51) Int. Cl.
*G09G 5/02* (2006.01)
*H04N 13/00* (2006.01)
(Continued)

(52) U.S. Cl.
CPC ......... *H04N 13/0018* (2013.01); *G09G 3/003* (2013.01); *G09G 3/3406* (2013.01);
(Continued)

(58) Field of Classification Search
CPC .. H04N 3/0018; H04N 3/0029; H04N 3/0051; H04N 3/0438; H04N 3/0497;
(Continued)

(56) References Cited

U.S. PATENT DOCUMENTS 7,038,651 B2   5/2006   Nitta et al.
8,044,910 B2 * 10/2011   Song .................... G09G 3/3614
                                                                345/96

(Continued)

FOREIGN PATENT DOCUMENTS

EP      2360931       8/2011
JP      2012-138713   7/2012
(Continued)

OTHER PUBLICATIONS

JP 2012-138713 machine translation.*
(Continued)

*Primary Examiner* — Lun-Yi Lao
*Assistant Examiner* — Peter D McCloone
(74) *Attorney, Agent, or Firm* — Innovation Counsel LLP

(57) ABSTRACT

A display device may include a frame rate determining unit configured to receive an input image signal and configured to select, based on the input image signal, one of a first frame rate and a second frame rate to be a selected frame rate. The input image signal may include luminance information. The second frame rate may be equal to a natural number times the first frame rate. The natural number may be greater than or equal to 2. The display device may further include a display panel configured to display a first image according to at least a control signal generated based on the selected frame rate.

26 Claims, 20 Drawing Sheets

(51) Int. Cl.
   *G09G 3/00* (2006.01)
   *G09G 3/34* (2006.01)
   *G09G 3/36* (2006.01)
   *H04N 13/04* (2006.01)
(52) U.S. Cl.
   CPC ....... *G09G 3/3607* (2013.01); *H04N 13/0029* (2013.01); *H04N 13/0051* (2013.01); *H04N 13/0438* (2013.01); *H04N 13/0497* (2013.01); *G09G 2310/024* (2013.01); *G09G 2310/0205* (2013.01); *G09G 2320/0209* (2013.01); *G09G 2320/0257* (2013.01); *G09G 2320/0261* (2013.01); *G09G 2320/0613* (2013.01); *G09G 2320/0633* (2013.01); *G09G 2340/0435* (2013.01); *G09G 2340/16* (2013.01); *G09G 2360/16* (2013.01); *H04N 13/0452* (2013.01)
(58) Field of Classification Search
   CPC .... H04N 3/0452; G09G 3/003; G09G 3/3406; G09G 3/342; G09G 3/3607; G09G 2310/0205; G09G 2310/024; G09G 2320/0209; G09G 2320/0257; G09G 2320/0261; G09G 2320/0613; G09G 2320/0633; G09G 2340/0435; G09G 2340/16; G09G 2360/16
   See application file for complete search history.

(56) References Cited

U.S. PATENT DOCUMENTS

| | | | | |
|---|---|---|---|---|
| 8,144,255 B2* | 3/2012 | Hirayama | ............ | G06K 9/3266 348/468 |
| 8,358,373 B2* | 1/2013 | Yamamoto | ............ | G09G 3/3648 348/441 |
| 8,378,954 B2 | 2/2013 | Brown | | |
| 8,422,828 B2* | 4/2013 | Fukuda | ................ | H04N 19/132 348/241 |
| 8,446,395 B2* | 5/2013 | Song | ................... | G09G 3/3614 345/209 |
| 8,462,266 B2* | 6/2013 | Ueno | ................... | G09G 3/3611 348/441 |
| 8,466,864 B2* | 6/2013 | Munteanu | ............ | G09G 3/3406 345/100 |
| 2003/0016205 A1 | 1/2003 | Kawabata et al. | | |
| 2005/0162367 A1* | 7/2005 | Kobayashi | ........... | G09G 3/3648 345/98 |
| 2007/0200838 A1* | 8/2007 | Lee | ........................ | G09G 5/12 345/204 |
| 2008/0036753 A1* | 2/2008 | Washio | ................ | G09G 3/3648 345/212 |
| 2008/0198116 A1 | 8/2008 | Kim | | |
| 2008/0252578 A1* | 10/2008 | Kim | ................... | G02B 27/2214 345/87 |
| 2008/0284704 A1 | 11/2008 | Song et al. | | |
| 2009/0160845 A1 | 6/2009 | Jang et al. | | |
| 2010/0091185 A1* | 4/2010 | Ueno | ................... | G09G 3/3611 348/452 |
| 2010/0321566 A1* | 12/2010 | Yamamoto | ........... | G09G 3/3648 348/441 |
| 2011/0128448 A1* | 6/2011 | Bellers | ...................... | H04N 5/14 348/614 |
| 2011/0249091 A1* | 10/2011 | Kishimoto | ............. | G09G 5/005 348/43 |
| 2012/0162159 A1* | 6/2012 | Kim | ...................... | G09G 3/3233 345/204 |
| 2012/0236021 A1* | 9/2012 | Parmar | ................ | G09G 3/2044 345/597 |
| 2012/0293762 A1 | 11/2012 | Shin et al. | | |
| 2013/0044273 A1 | 2/2013 | Ueno et al. | | |
| 2013/0070004 A1* | 3/2013 | Inoue | ..................... | G09G 3/003 345/690 |
| 2013/0082981 A1* | 4/2013 | Chien | ................... | G06F 3/0425 345/175 |
| 2013/0100012 A1* | 4/2013 | Todorovich | .......... | G09G 3/3466 345/156 |

FOREIGN PATENT DOCUMENTS

| | | |
|---|---|---|
| KR | 10-2005-0054520 | 6/2005 |
| KR | 10-2008-0086060 | 9/2008 |
| KR | 10-2010-0128019 | 12/2010 |
| KR | 10-2012-0070991 | 7/2012 |
| KR | 10-2013-0035317 | 4/2013 |

OTHER PUBLICATIONS

European Search Report corresponding to European Patent Application No. 14191650.2, Apr. 23, 2015, 7 pages.
European Search Report corresponding to European Patent Application No. 14191650.2, Sep. 3, 2015, 17 pages.

* cited by examiner

DISPLAY DEVICE, CONTROLLER FOR CONTROLLING OPERATION OF THE DISPLAY DEVICE, AND METHOD FOR OPERATING THE DISPLAY DEVICE

CROSS-REFERENCE TO RELATED APPLICATION

This application claims priority to and the benefit of Korean Patent Application No. 10-2013-0155782 filed in the Korean Intellectual Property Office on Dec. 13, 2013, the entire contents of which are incorporated herein by reference.

BACKGROUND (a) Technical Field

The present invention relates to a display device, a related controller, and a related driving (i.e., controlling or operating) method.

(b) Description of the Related Art

A display device, such as a liquid crystal display (LCD) or an organic light emitting diode display, generally includes a display panel and a driving apparatus for driving (i.e., controlling or operating) the display panel.

The display panel includes a plurality of signal lines and a plurality of pixels connected thereto and arranged substantially in a matrix form.

The signal lines include a plurality of gate lines for transferring gate signals, a plurality of data lines for transferring data voltages, and the like.

Each pixel may include at least one switching element connected to the corresponding gate line and the corresponding data line, at least one pixel electrode connected to the switching element, and a portion of a common electrode overlapping the pixel electrode and configured for receiving a common voltage.

The switching element may include at least one thin film transistor and may be turned on or off according to the gate signal transferred by the gate line to selectively transfer the data voltage transferred by the data line to the pixel electrode. Each pixel may receive a data voltage corresponding to desired luminance information through the switching element. The data voltage applied to the pixel may be represented as a pixel voltage according to a difference between the data voltage and the common voltage, and each pixel may display luminance according to a pixel voltage.

The driving apparatus of the display device includes a graphic controller, a driver, and a signal controller configured for controlling the driver.

The graphic controller may transmit an input image signal (for an image to be displayed) to the signal controller. The input image signal may include luminance information of each pixel, and the luminance information of each pixel may have a predetermined number.

The signal controller may generate a control signal for driving (i.e., controlling) the display panel and may transmit the control signal (together with an image signal) to the driver.

The driver may include a gate driver for generating a gate signal and may include a data driver for generating a data voltage.

A display device may be further configured to display a three-dimensional (3D) image.

In general, binocular parallax may be utilized for implementing a 3D effect at a short distance. In utilizing binocular parallax, different two-dimensional (2D) images may be respectively provided to the left eye and the right eye. When the image provided to the left eye (hereafter referred to as "left eye image") and the image provided to the right eye (hereafter referred to as "right eye image") are provided to the brain, the left eye image and the right eye image may be combined in the brain, such that a 3D image having a depth may be perceived.

A stereoscopic 3D image display device may require a viewer to wear glasses, such as shutter glasses or polarized glasses. An autostereoscopic 3D image display device may include an optical system, such as a lenticular lens or a parallax barrier, without requiring a viewer to wear glasses.

The above information disclosed in this Background section is for enhancement of understanding of the background of the invention. The Background section may contain information that does not form the prior art that is already known in this country to a person of ordinary skill in the art.

SUMMARY

Embodiments of the present invention may be related to a display device and may be related to a method for selecting a suitable frame rate based on image information for the display device to display an image. Embodiments of the invention may advantageously minimize inter-frame crosstalk and/or judder, such that images, e.g., 3D images, with satisfactory quality may be perceived by a viewer of the display device.

An embodiment of the present invention may be related to a display device that may include a frame rate determining unit configured to receive an input image signal and configured to select, based on the input image signal, one of a first frame rate and a second frame rate to be a selected frame rate. The input image signal may include luminance information. The second frame rate may be equal to a natural number times the first frame rate. The natural number may be greater than or equal to 2. The display device may further include a display panel configured to display a first image according to at least a control signal generated based on the selected frame rate.

The frame rate determining unit may calculate a quantity value based on the input image signal and may determine the selected frame rate based on the quantity value.

The quantity value may include a vertical resolution quantity value. The frame rate determining unit may calculate the vertical resolution quantity value by adding absolute values of gray differences of adjacent rows for columns of the display panel according to the input image signal. The frame rate determining unit may select the first frame rate to be the selected frame rate if the vertical resolution quantity value is larger than a vertical resolution reference value. The frame rate determining unit may select the second frame rate to be the selected frame rate if the vertical resolution quantity value is less than or equal to the vertical resolution reference value.

The quantity value may include an inter-frame difference quantity value. The frame rate determining unit may calculate the inter-frame difference quantity value by adding absolute values of gray differences of consecutive frames for pixels of the display panel according to the input image signal. The frame rate determining unit may select the second frame rate to be the selected frame rate if the inter-frame difference quantity value is larger than an inter-frame difference reference value. The frame rate determining unit may select the first frame rate to be the selected frame rate if the inter-frame difference quantity value is less than or equal to the inter-frame difference reference value.

The quantity value may include a depth information quantity value. The frame rate determining unit may calculate the depth information quantity value by adding absolute values of gray differences of viewpoints according to the input image signal. The frame rate determining unit may select the second frame rate to be the selected frame rate if the depth information quantity value is larger than a depth information difference reference value. The frame rate determining unit may select the first frame rate to be the selected frame rate if the depth information quantity value is less than or equal to the depth information reference value.

The display device may include a backlight that includes a first light emitting block corresponding to a first portion of the display panel and includes a second light emitting block corresponding to a second portion of the display panel. The second portion of the display panel may be positioned lower than the first portion of the display panel when the display device is in operation. An on time period of the second light emitting block positioned for a frame may be shorter than an on time period of the first light emitting block for the frame.

The display device may include a middle frame determining unit connected to the frame rate determining unit and configured to determine whether the display panel is to display any middle frame after displaying a previous image and before displaying the first image. The previous image may be displayed at a previous frame rate that is different from the selected frame rate.

The middle frame determining unit may calculate an inter-frame difference quantity value by adding absolute values of gray differences of consecutive frames for pixels of the display panel according to the input image signal. The middle frame determining unit may determine that a middle frame is required if the inter-frame difference quantity value is in an inter-frame difference value range. The middle frame determining unit may determine that no middle frame is required if the inter-frame difference quantity value is outside the inter-frame difference value range.

The middle frame determining unit may calculate a frame luminance difference quantity value by calculating an absolute value of a difference between a sum of grays for a first frame and a sum of grays for a second frame according to the input image signal. The middle frame determining unit may determine that no middle frame is required if the frame luminance quantity value is larger than a frame luminance difference reference value. The middle frame determining unit may determine that a middle frame is required if the frame luminance quantity value is less than or equal to the frame luminance difference reference value.

The display device may include a middle frame information generator configured to generate middle frame information in response to a decision of the middle frame determining unit that a middle frame is required. The middle frame information may specify that a pulse of a first vertical start signal is delayed for a first hold period in displaying the middle frame and that the display device is to display a dummy image for the first hold period. The display panel may display the dummy image at the second frame rate after the first hold period. The middle frame information may further specify that a pulse of a second vertical start signal is delayed for a second hold period after the display panel has started displaying the dummy image.

The display device may include a middle frame information generator configured to generate middle frame information in response to a decision of the middle frame determining unit that a middle frame is required. The middle frame information may specify that the display panel is to display a first portion of the middle frame at the first frame rate and that the display panel is to display a second portion of the middle frame at the second frame rate. A first region of the display panel may display the first portion of the middle frame. A second region of the display panel may display the second portion of the middle frame. The second region of the display panel may be positioned lower than the first region of the display panel. The middle frame information may further specify that a pulse of a vertical start signal is delayed for a hold period after the display panel has started displaying the middle frame.

The display device may include a signal controller configured to generate the control signal based on the selected frame rate. The frame rate determining unit may be included in a graphic controller that is external to the signal controller.

The display device may include a first signal line electrically connected to each of the graphic controller and the signal controller and configured to transmit the input image signal from the graphic controller to the signal controller. The display device may further include a second signal line insulated from the first signal line, electrically connected to each of the graphic controller and the signal controller, and configured to transmit an instruction signal from the graphic controller to the signal controller, the instruction signal being generated by the frame rate determining unit according to the selected frame rate.

The display device may include a signal line electrically connected to each of the graphic controller and the signal controller. The signal line may transmit the input image signal and an instruction signal from the graphic controller to the signal controller. The instruction signal may be generated by the frame rate determining unit according to the selected frame rate and may be included in a vertical blank period signal to be transmitted, between input image signals, to the signal controller.

An embodiment of the invention may be related to method for operating a display device. The display device may include a display panel. The method may include the following steps: receiving an input image signal that includes luminance information; based on the input image signal, selecting one of a first frame rate and a second frame rate to be a selected frame rate; and controlling the display panel to display a first image using at least a control signal generated according to the selected frame rate. The second frame rate may be equal to a natural number times the first frame rate. The natural number may be greater than or equal to 2.

The method may include the following steps: calculating a quantity value for quantifying a characteristic of the input image signal; and determining the selected frame rate based on the quantity value.

The quantity value may include a vertical resolution quantity value calculated by adding absolute values of gray differences of adjacent rows for columns of the display panel according to the input image signal. If the vertical resolution quantity value is larger than a vertical resolution reference value, the selected frame rate may be equal to the first frame rate. If the vertical resolution quantity value is less than or equal to the vertical resolution value, the selected frame rate may be equal to the second frame rate.

The quantity value may include an inter-frame difference quantity value calculated by adding absolute values of gray differences of consecutive frames for pixels of the display panel according to the input image signal. If the inter-frame difference quantity value is larger than an inter-frame difference reference value, the selected frame rate may be equal to second frame rate. If the inter-frame difference quantity value is less than or equal to the inter-frame difference reference value, the selected frame rate may be equal to the first frame rate.

The quantity value may include a depth information quantity value calculated by adding absolute values of gray differences of viewpoints according to the input image signal. The second frame rate may be selected to be the selected frame rate if the depth information quantity value is larger than a depth information difference reference value. The first frame rate may be selected to be the selected frame rate if the depth information quantity value is less than or equal to the depth information reference value.

The display device may include a backlight that includes a first light emitting block corresponding to a first portion of the display panel and includes a second light emitting block corresponding to a second portion of the display panel. The second portion of the display panel may be positioned lower than the first portion of the display panel when the display device is in operation. An on time period of the second light emitting block positioned for a frame may be shorter than an on time period of the first light emitting block for the frame.

The method may include determining whether the display panel is to display any middle frame after displaying a previous image and before displaying the first image. The previous image may be displayed at a previous frame rate that is different from the selected frame rate.

The method may include the following steps: calculating an inter-frame difference quantity value by adding absolute values of consecutive frames for pixels of the display panel according to the input image signal; determining that a middle frame is required if the inter-frame difference quantity value is in an inter-frame difference value range; and determining that no middle frame is required if the inter-frame difference quantity value is outside the inter-frame difference value range.

The method may include the following steps: calculating a frame luminance difference quantity value by calculating an absolute value of a difference between a sum of grays for the first frame and a sum of grays for the second frame according to the input image signal; determining that no middle frame is required if the frame luminance quantity value is larger than a frame luminance difference reference value; and determining that a middle frame is required if the frame luminance quantity value is less than or equal to the frame luminance difference reference value.

A middle frame is implemented. A pulse of a first vertical start signal may be delayed for a first hold period during display of the middle frame. A dummy image is displayed for the first hold period. The display panel may display the dummy image at the second frame rate after the first hold period. A pulse of a second vertical start signal may be delayed for a second hold period after the display panel has started displaying the dummy image.

A middle frame may be implemented. The display panel may display a first portion of the middle frame at the first frame rate. The display panel may display a second portion of the middle frame at the second frame rate. A first region of the display panel may display the first portion of the middle frame. A second region of the display panel may display the second portion of the middle frame. The second region of the display panel may be positioned lower than the first region of the display panel.

The method may include delaying a pulse of a vertical start signal for a hold period after the display panel has started displaying the middle frame.

The method may include the following steps: generating an instruction signal according to the selected frame rate; and transmitting the input image signal and an instruction signal through a same signal line. The instruction signal may be included in a vertical blank period signal transmitted between input image signals.

An embodiment of the present invention may be related to a controller for controlling operation of a display device. The display device may include a display panel. The controller may include a frame rate determining unit configured to receive an input image signal and configured to select, based on the input image signal, one of a first frame rate and a second frame rate to be a selected frame rate. The input image signal may include luminance information. The second frame rate may be equal to a natural number times the first frame rate. The natural number may be greater than or equal to 2. The controller may further include hardware (e.g., electronic components) for performing one or more tasks of the frame rate determining unit.

The controller may further include a middle frame determining unit connected to the frame rate determining unit and configured to determine whether the display panel is to display any middle frame after displaying a previous image and before displaying the first image. The previous image may be displayed at a previous frame rate that is different from the selected frame rate.

An embodiment of the present invention may be related a display device that may include the following elements: a display panel including a plurality of pixels, a plurality of gate lines, and a plurality of data lines; a gate driver applying gate-on voltages to the plurality of gate lines; a data driver for applying data voltages to the plurality of data lines; a signal controller for controlling the gate driver and the data driver; a graphic controller for transferring an input image signal for a first frame to the signal controller; and a frame rate controller for determining a frame rate of the first frame as one of a first frame rate and a second frame rate which are different from each other, according to a characteristic of an image determined by using a gray of the input image signal for the first frame, in which the second frame rate is N (N is a natural number of 2 or more) times the first frame rate, and the signal controller controls the gate driver and the data driver according to the determined frame rate of the first frame of the frame rate controller.

An embodiment of the present invention may be related to a driving (i.e., operating or controlling) method of a display device. The display device may include the following elements: a display panel including a plurality of pixels, a plurality of gate lines, and a plurality of data lines, a gate driver applying gate-on voltages to the plurality of gate lines, and a data driver applying data voltages to the plurality of data lines. The method may include the following steps: inputting an input image signal for a first frame; determining a frame rate as one of a first frame rate and a second frame rate which are different from each other according to a characteristic of an image by using a gray of the input image signal for the first frame; and controlling the gate driver and the data driver according to the determined frame rate of the first frame of the frame rate controller, in which the second frame rate is N times (N is a natural number of 2 or more) the first frame rate.

The frame rate controller may include a frame rate determining unit which quantifies a characteristic of the image of the first frame to calculate a quantity value and determines the frame rate based on the quantity value.

The characteristic of the image may include a vertical resolution, the quantity value may include a vertical resolution quantity value calculated by adding all absolute values of gray differences of the input image signals in adjacent rows in each column of the display panel, and when the vertical resolution quantity value is larger than a predetermined first reference value, the frame rate determining unit may determine the frame rate as the first frame rate, and when the vertical resolution quantity value is smaller than or the same as the first reference value, the frame rate determining unit may determine the frame rate as the second frame rate.

The characteristic of the image may include an inter-frame difference, the quantity value may include an inter-frame difference quantity value calculated by adding all absolute values of gray differences of the input image signal between the first frame and a second frame which is a previous frame of the first frame with respect to the respective pixels of the display panel, and when the inter-frame difference quantity value is larger than a predetermined second reference value, the frame rate determining unit may determine the frame rate as the second frame rate, and when the inter-frame difference quantity value is smaller than or the same as the predetermined second reference value, the frame rate determining unit may determine the frame rate as the first frame rate.

The display device may further include a 3D image conversion member configured to make different images be recognized at different viewpoints by dividing an image displayed by the display panel.

The signal controller may control a driving timing of the 3D image conversion member according to the frame rate determined by the frame rate controller.

The display device may further include shutter glasses configured to make different images be recognized at different viewpoints by dividing an image displayed by the display panel, in which each pixel displays an image for the first view point and an image for the second view point at the first frame and the second frame which is a previous frame of the first frame, respectively, the characteristic of the image includes a depth information quantity value of a 3D image, and the depth information quantity value is calculated by adding all absolute values of differences between a gray of the input image signal for the first view point and a gray of the input image signal for the second view point with respect to the respective pixels of the display panel.

The display device may further include a backlight supplying light to the display panel; and a backlight controller driving the backlight, in which the signal controller controls the backlight controller according to the frame rate determined by the frame rate controller.

The backlight may include a blinking backlight which is turned on or off simultaneously correspondingly to an entire area of the display panel, or include a plurality of light emitting blocks which are independently driven, and when the backlight includes the plurality of light emitting blocks which are independently driven, an on time of the light emitting block positioned at a bottom side among the light emitting blocks may be shorter than an on time of the light emitting block positioned at a top side in a frame just before the frame rate is changed from the first frame rate to the second frame rate.

The frame rate controller may further include a middle frame determining unit which determines whether a middle frame between a period when the display panel is driven at the first frame rate and a period when the display panel is driven at the second frame rate is required, when the frame rate determining unit determines the frame rate as the second frame rate.

The frame rate controller may further include a frame memory storing an input image signal of the second frame which is a previous frame of the first frame.

The middle frame determining unit may calculate an inter-frame difference quantity value calculated by adding all absolute values of gray differences of the input image signal for the first frame and the input image signal for the second frame with respect to each pixel of the display panel, and the middle frame determining unit may determine that the middle frame is required when the inter-frame difference quantity value is between a predetermined third reference value and a predetermined fourth reference value, and if not, may determine that the middle frame is not required.

The middle frame determining unit may calculate a frame luminance quantity value which is an absolute value of a difference between a sum of grays of the input image signal for the first frame and a sum of grays of the input image signal for the second frame, and the middle frame determining unit may determine that the middle frame is not required when the frame luminance quantity value is larger than a predetermined fifth reference value, and if not, may determine that the middle frame is required.

When the middle frame determining unit may determine that the middle frame is required, a pulse of a vertical start signal may be delayed for a first hold period in the middle frame, and a dummy image signal may be input to the data diver for the first hold period.

In the middle frame, the data voltage may be applied to the display panel at the second frame rate after the first hold period ends, and after the applying of the data voltage to the display panel is completed, the pulse of the vertical start signal for a next frame may be delayed for a second hold period.

When the middle frame determining unit determines that the middle frame is required, a first region of the display panel of the middle frame may be driven at the first frame rate, and a second region except for the first region of the display panel may be driven at the second frame rate.

In the middle frame, after the second region is driven at the second frame rate, the pulse of the vertical start signal for a next frame may be delayed for a hold period.

The frame rate controller may be included in the signal controller or the graphic controller.

The input image signal may be transferred through a first wiring connecting the graphic controller and the signal controller, and when the frame rate controller is included in the graphic controller, a determining result of the frame rate controller may be transferred through a second wiring separate from the first wiring, the second wiring connecting the graphic controller and the signal controller.

When the frame rate controller is included in the graphic controller, the determining result of the frame rate controller may be included in a vertical blank period to be transferred to the signal controller.

According embodiments of the present invention, image display quality may be optimized through selection of suitable frame rates based on image information.

DETAILED DESCRIPTION OF THE EMBODIMENTS

Embodiments of the present invention will be described more fully hereinafter with reference to the accompanying drawings. As those skilled in the art would realize, the described embodiments may be modified in various different ways, all without departing from the spirit or scope of the present invention.

In this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Although the terms "first", "second", etc. may be used herein to describe various elements, these elements, should not be limited by these terms. These terms may be used to distinguish one element from another element. Thus, a first element discussed below may be termed a second element without departing from the teachings of the present invention. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

Various embodiments, including methods and techniques, are described in this disclosure. It should be kept in mind that the invention might also cover an article of manufacture that includes a non-transitory computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to embodiments of the invention.

Figure 1:
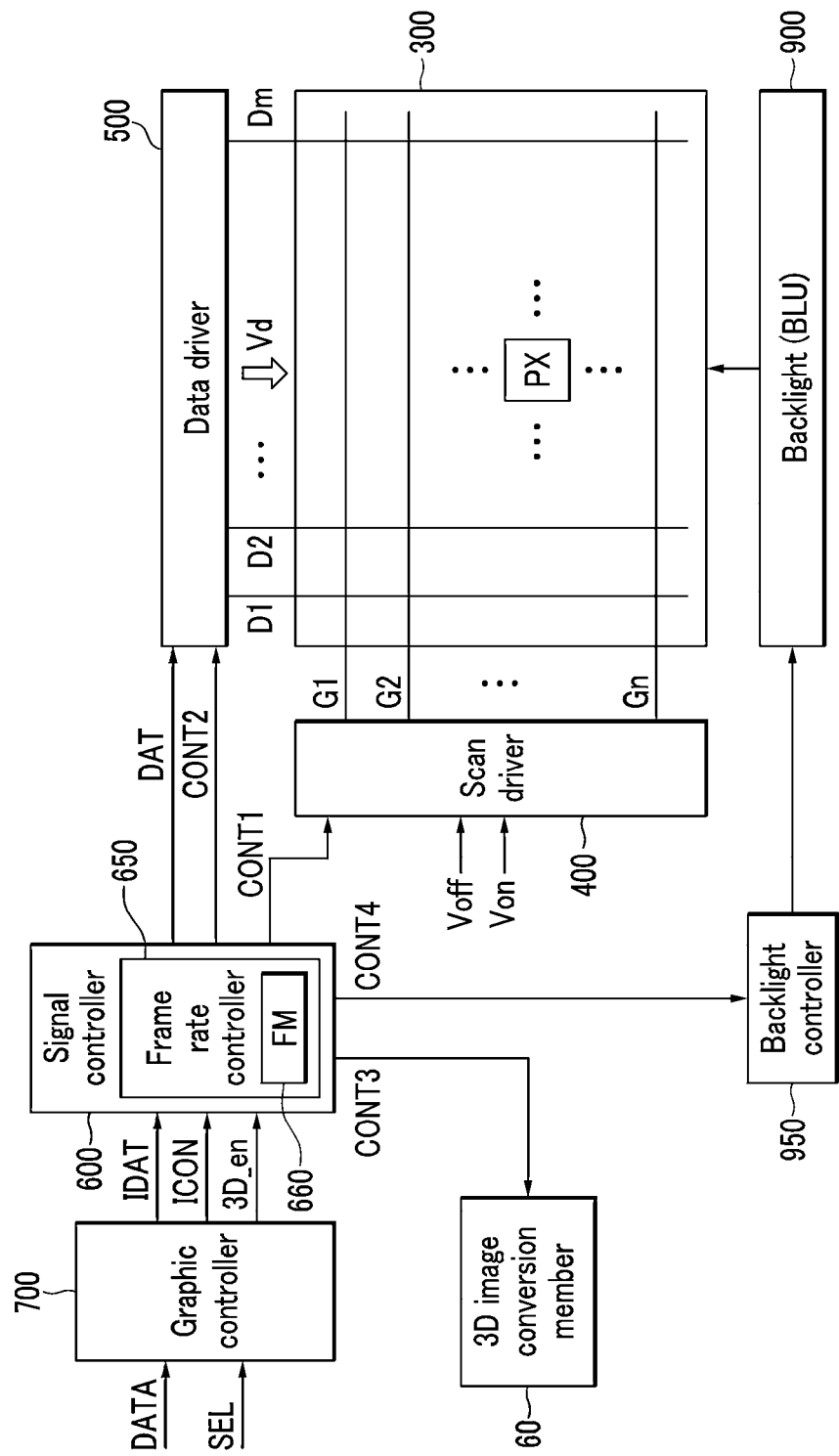
FIG. 1 is a block diagram illustrating a display device according to an embodiment of the present invention.
Figure 2:
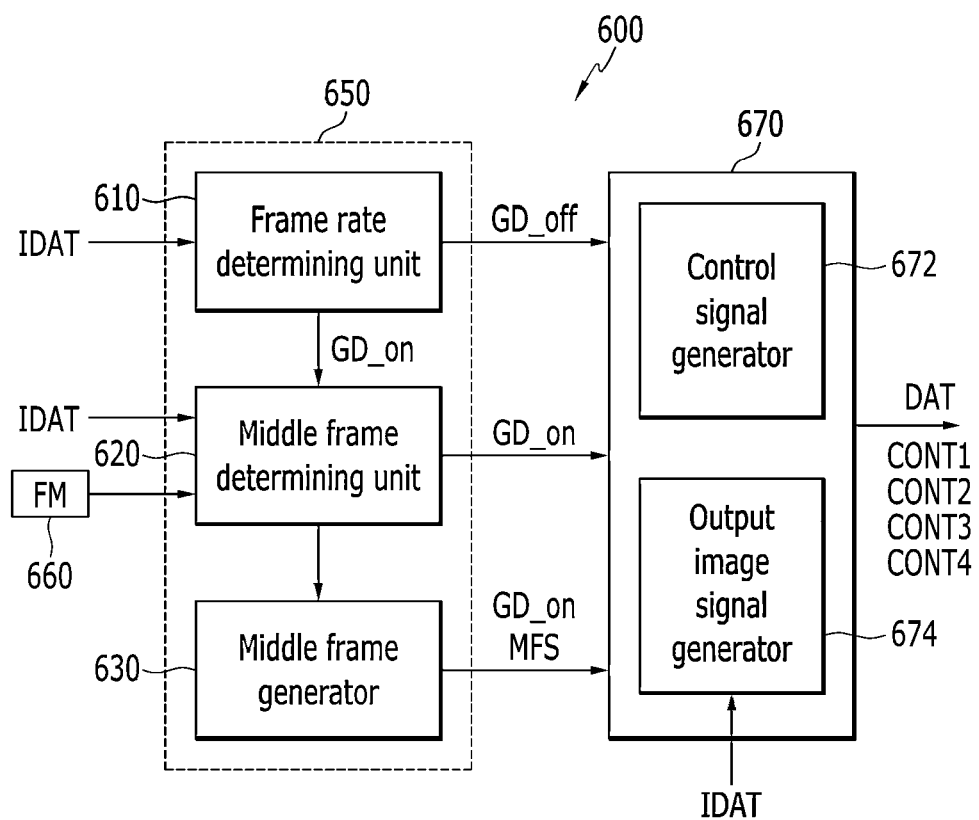
FIG. 2 is a block diagram illustrating a signal controller included in the display device according to an embodiment of the present invention.
Figure 3:
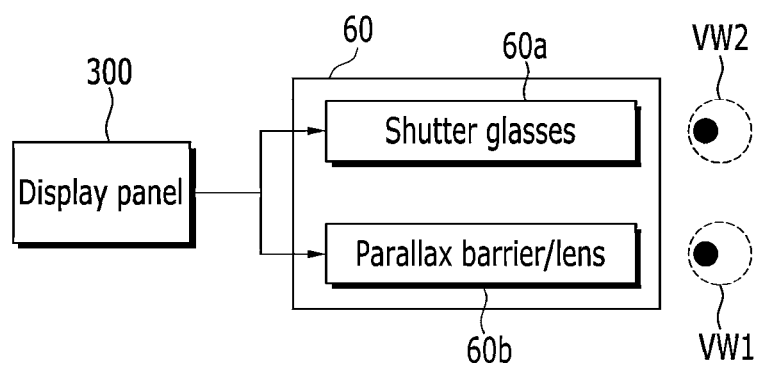
FIG. 3 is a block diagram illustrating elements of the display device according to an embodiment of the present invention.
Figure 4:
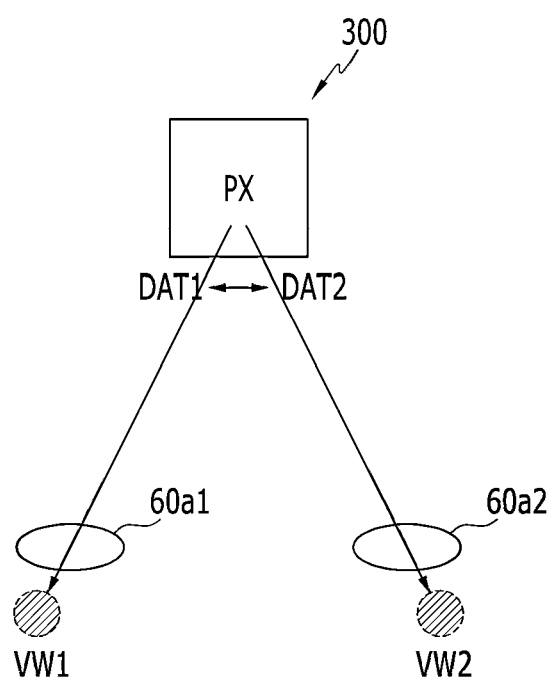
FIG. 4 is a diagram illustrating a method of displaying a 3D image using shutter glasses in the display device according to an embodiment of the present invention.

FIG. 1 is a block diagram illustrating a display device according to an embodiment of the present invention. FIG. 2 is a block diagram of a signal controller included in the display device according to an embodiment of the present invention. FIG. 3 is a block diagram illustrating elements of the display device according to an embodiment of the present invention. FIG. 4 is a diagram illustrating a method of displaying a 3D image using shutter glasses in the display device according to an embodiment of the present invention.

Referring to FIG. 1, the display device may include a graphic controller 700, a display panel 300, a gate driver 400 (or scan driver 400) and a data driver 500 connected to the display panel 300, a backlight 900 (or backlight unit 900) configured for supplying light to the display panel 300, a backlight controller 950 configured for controlling the backlight 900, and a signal controller 600.

The graphic controller 700 may receive image information DATA, mode selection information SEL, etc. from an external source outside the display device. The mode selection information SEL may include selection information regarding whether to display the image in a 2D mode or a 3D mode. The graphic controller 700 may generate an input image signal IDAT and an input control signal ICON for controlling display of the input image signal IDAT based on the image information DATA and the mode selection information SEL. The graphic controller 700 may further generate a 3D enable signal 3D_en if the mode selection information SEL includes information to select the 3D mode. The input image signal IDAT, the input control signal ICON, and the 3D enable signal 3D_en may be transferred to the signal controller 600.

The input image signal IDAT may include luminance information, and the luminance information may have a predetermined number of grays. The input control signal ICON may include a vertical synchronization signal Vsync, a horizontal synchronization signal Hsync, a main clock MCLK, a data enable signal DE, etc. with regard to image display. According to an embodiment of the present invention, the input control signal ICON may further include frame rate information.

The 3D enable signal 3D_en may instruct the display device to operate in the 3D mode to display the 3D image. In an embodiment, the 3D enable signal 3D_en may be omitted.

The display panel 300 may include a plurality of signal lines and may include a plurality of pixels PX connected to the plurality of signal lines and arranged substantially in a matrix form (when represented by an equivalent circuit). In an embodiment of the present invention, the display device is a liquid crystal display, and the display panel 300 may include lower and upper panels (not illustrated) overlapping each other and may include a liquid crystal display (not illustrated) interposed between the two panels.

The signal lines include a plurality of gate lines G1-Gn configured for providing gate signals and extending in a row direction. The signal lines further include a plurality of data lines D1-Dm configured for providing data voltages and extending in a column direction.

A pixel PX may include at least one switching element (not illustrated) connected to at least one data line and at least one gate line and may include at least one pixel electrode (not illustrated) connected to the switching element. The switching element may include at least one thin film transistor and may be controlled according to a gate signal (transmitted by the gate line) to provide a data voltage Vd (transmitted by the data line) to a pixel electrode.

In order to implement color display, different pixels PX may display different primary colors (spatial division), and/or each pixel PX may display different primary colors according to time (temporal division), so that a desired color is recognized by the spatial and/or temporal sum of the primary colors.

The gate driver 400 is connected to the gate lines G1-Gn to sequentially apply gate signals, including gate-on voltages Von and gate-off voltages Voff, to gate lines G1-Gn.

The data driver 500 is connected to the data lines D1-Dm. The data driver 500 selects a data voltage Vd from a plurality of gray voltages to apply the selected data voltage Vd to the data lines D1-Dm. The data driver 500 may receive all gray voltages from a separate gray voltage generator (not illustrated), may receive only a predetermined number of reference gray voltages, and may divide the reference gray voltages to generate gray voltages for all grays.

The signal controller 600 may receive the input image signal IDAT, the input control signal ICON, the 3D enable signal 3D_en, etc. from the graphic controller 700, for controlling operations of the gate driver 400, the data driver 500, the 3D image conversion member 60, the backlight controller 950, etc.

The signal controller 600 may process the input image signal IDAT based the input control signal ICON in accordance with an operational condition of the display panel 300 to generate an output image signal DAT. The signal controller 600 may generate a gate control signal CONT1, a data control signal CONT2, a 3D image control signal CONT3, a backlight control signal CONT4, etc. The signal controller 600 may provide the gate control signal CONT1 to the gate driver 400, may provide the data control signal CONT2 to the data driver 500, may provide the 3D image control signal CONT3 to the 3D image conversion member 60, and may provide the backlight control signal CONT4 to the backlight controller 950.

The signal controller 600 may operate in a 2D mode for displaying a 2D image or may operate in a 3D mode for displaying a 3D image according to the 3D enable signal 3D_en received from the graphic controller 700. In the 3D mode, the output image signal DAT may include image signals having different viewpoints. In the 3D mode, a pixel PX of the display panel 300 may alternately display data voltages corresponding to image signals having different viewpoints, or different pixels PX may display data voltages corresponding to image signals having different viewpoints.

The signal controller 600 according to an embodiment of the present invention may include a frame rate controller 650. The frame rate controller 650 may control a frame rate, which is the number of frames (referred to as a "frame frequency") displayed by the display panel 300 in one second based on the input image signal IDAT. The signal controller 600 may generate the gate control signal CONT1, the data control signal CONT2, the 3D image control signal CONT3, the backlight control signal CONT4, etc. in accordance with an output of the frame rate controller 650.

The signal controller 600 may include a frame memory 660 that may store the input image signal IDAT by frames.

Referring to FIG. 2, the signal controller 600 according to an embodiment of the present invention may include the frame rate controller 650 and a signal generator 670.

The frame rate controller 650 may include a frame rate determining unit 610, a middle frame determining unit 620 (or intermediate frame determining unit 620), and a middle frame generator 630 (or middle frame information MFS generator 630).

The frame rate determining unit 610 may determine a frame rate based on the input image signal IDAT. The frame rate determined by the frame rate determining unit 610 may be a first frame rate F1 or a second frame rate F2. The first frame rate F1 is a frame rate corresponding to the rate at which the gate driver 400 scans the gate lines G1-Gn of the display panel 300 by one gate line unit to apply gate-on voltages Von. The second frame rate F2 may be larger than the first frame rate F1. In an embodiment, the second frame rate F2 may be N times the first frame rate F1, wherein N is a natural number of 2 or more than 2). For example, the second frame rate F2 may be two times the first frame rate F1. When the display panel 300 is driven (i.e., controlled) at the second frame rate F2, the gate driver 400 scans the gate lines G1-Gn by a unit of two or more sequential gate lines to apply gate-on voltages Von. A driving method of scanning the gate lines G1-Gn at the second frame rate F2 that doubles the first frame rate F1 is referred to as gate doubling, and execution of the gate doubling is referred to as doubling-on driving, and non-execution of the gate doubling is referred to as doubling-off driving. For example, when the first frame rate F1 is 120 Hz, the second frame rate F2 may be 240 Hz.

The data driver 500 may apply a data voltage Vd to the display panel 300 at the same driving frequency with respect to different frame rates.

The frame rate determining unit 610 may output a doubling-off driving instruction signal GD_off to the signal generator 670 if the frame rate is determined to be the first frame rate F1. The frame rate determining unit 610 may output a doubling-on driving instruction signal GD_on to the middle frame determining unit 620 if the frame rate is to be converted from the first frame rate F1 to the second frame rate F2.

The middle frame determining unit 620 may receive a doubling-on driving instruction signal GD_on from the frame rate determining unit 610 if the frame rate determining unit 610 determines the frame rate is to be converted into the second frame rate F2 and may determine whether a middle frame (or intermediate frame) is required. The middle frame determining unit 620 may determine whether the middle frame is required based on an input image signal IDAT of a current frame and an input image signal IDAT of a previous frame stored in the frame memory 660. The middle frame may include a hold period generated by delaying a vertical start signal STV as a frame inserted between (e.g., in the middle) two frames if the frame rate is changed from the first frame rate F1 to the second frame rate F2 or from the second frame rate F2 to the first frame rate F1. The middle frame determining unit 620 may transfer the doubling-on driving instruction signal GD_on to the signal generator 670 if the middle frame is not required.

If the middle frame determining unit 620 determines that a middle frame is required, the middle frame generator 630 may delay the vertical start signal STV to generate middle frame information MFS and then provide the doubling-on driving instruction signal GD_on and the middle frame information MFS to the signal generator 670.

The signal generator 670 may include a control signal generator 672 for generating many control signals and may include an output image signal generator 674 for generating an output image signal DAT.

The control signal generator 672 may generate control signals (such as the gate control signal CONT1, the data control signal CONT2, the 3D image control signal CONT3, and the backlight control signal CONT4) based on the doubling-off driving instruction signal GD_off or the doubling-on driving instruction signal GD_on, which is input from the frame rate controller 650.

A vertical start signal STV included in the gate control signal CONT1 may be configured for instructing a scanning start of the gate-on voltages Von. If the doubling-off driving instruction signal GD_off is input to the control signal generator 672, the control signal generator 672 may generate the vertical start signal STV in accordance with the first frame rate F1. If the doubling-on driving instruction signal GD_on is input to the control signal generator 672, the control signal generator 672 may generate the vertical start signal STV in accordance with the second frame rate F2. In an embodiment, the second frame rate F2 is substantially two times the first frame rate F1, and a pulse period of the vertical start signal STV for the first frame rate F1 may be substantially two times a pulse period of the vertical start signal STV for the second frame rate F2.

A gate clock signal CPV included in the gate control signal CONT1 may be configured for controlling an output period of a signal gate-on voltage Von. If the doubling-off driving instruction signal GD_off is input, the control signal generator 672 may generate the gate clock signal CPV in accordance with the first frame rate F1. If the doubling-on driving instruction signal GD_on is input, the control signal generator 672 may generate the gate clock signal CPV in accordance with the second frame rate F2. In an embodiment, the second frame rate F2 is substantially two times the first frame rate F1, and a pulse period of the gate clock signal CPV for the first frame rate F1 may be substantially two times a pulse period of the gate clock signal CPV of the second frame rate F2.

The output image signal generator 674 may process the input image signal IDAT based on the doubling-off driving instruction signal GD_off or the doubling-on driving instruction signal GD_on (which is input from the frame rate controller 650) to generate an output image signal DAT. The output image signal DAT generated in response to the doubling-on driving instruction signal GD_on may be a compressed image signal of the output image signal DAT generated in response to the doubling-off driving instruction signal GD_off. In an embodiment, a resolution of the output image signal DAT generated in response to the doubling-on driving instruction signal GD_on may be substantially 1/N times a resolution of the output image signal DAT generated in response to the doubling-off driving instruction signal GD_off.

Referring to back to FIG. 1, the backlight 900 may be positioned at the rear side of the display panel 300 and may include at least one light source. Examples of the light source may include a fluorescent lamp such as a cold cathode fluorescent lamp (CCFL), a light emitting diode (LED), etc. The light source included in the backlight 900 may be turned on or off for a predetermined time depending on control performed by the backlight controller 950 according to the backlight control signal CONT4. The light sources of the backlight 900 may be driven at the same time and/or may be driven according to a plurality of light emitting blocks.

The backlight controller 950 drives (i.e., controls) the backlight 900 according to the backlight control signal CONT4 from the signal controller 600.

In an embodiment, the display device is a self-emission display device, and the backlight 900 and the backlight controller 950 may be omitted.

The display device may further include a 3D image conversion member 60 used in the 3D mode for displaying the 3D image. The 3D image conversion member 60 may allow different images (or different portions of an image) corresponding to different viewpoints to be recognized at respective viewpoints. The 3D image conversion member 60 may operate in synchronization with the display panel 300.

For example, the 3D image conversion member 60 may allow an image (or light associated with the image) suitable for a left eye (referred to as a "left eye image") to be provided (or incident) to the left eye of a viewer and may allow an image (or light associated with the image) suitable for a right eye (referred to as a "right eye image") to be provided (or incident) to the right eye of the viewer, in order to generate binocular disparity. That is, the 3D image conversion member 60 may allow different images to be received at different viewpoints, such that the viewer may perceive a 3D image.

Referring to FIG. 3, the 3D image conversion member 60 may include an optical system 60*b* (which may include a parallax barrier and/or a lens) and/or shutter glasses 60*a* (which may include light blocking parts and light transmitting parts that are alternately arranged). Different images may be viewed at different viewpoints, such as a first view point VW1 (e.g., a first eye position) and a second view point VW2 (e.g., a second eye position), through the 3D image conversion member 60.

Referring to FIG. 4, the display device may be a stereoscopic 3D image display device.

A pixel PX of the display panel 300 may display an output image signal DAT1 for the first view point VW1 and may display an output image signal DAT2 for the second view point VW2 at different times. The left eye of a viewer may view a left image corresponding to the signal DAT1 at the first view point VW1 through the shutter glasses 60a1, and the right eye of the viewer may view a right image corresponding to the signal DAT2 at the second view point VW2 viewpoints through the shutter glasses 60a2. The shutter glasses 60a1 and the shutter glasses 60a2 may be turned on/off at different timings and may operate in synchronization with the display panel 300.

For example, the display panel 300 may alternately display the left image corresponding to the first view point VW1 and the right image corresponding to the second view point VW2, and the shutter glasses 60a1 and the shutter glasses 60a2 may alternately transmit and block light in synchronization with the display panel 300. As a result, the viewer may perceive a 3D image.

Figure 5:
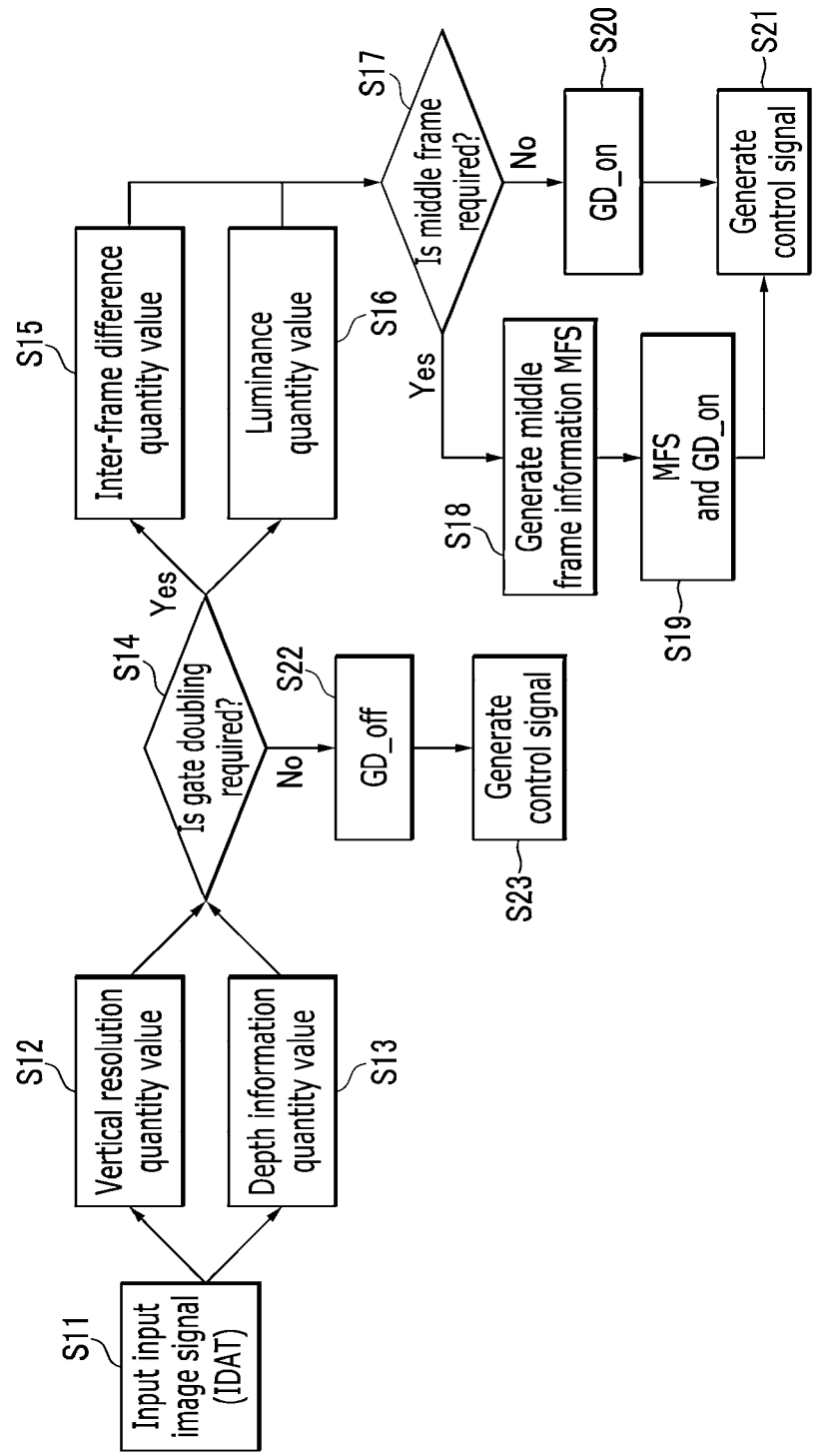
FIG. 5 is a flowchart illustrating a method of controlling a frame rate based on an input image signal in a display device according to an embodiment of the present invention.
Figure 6:
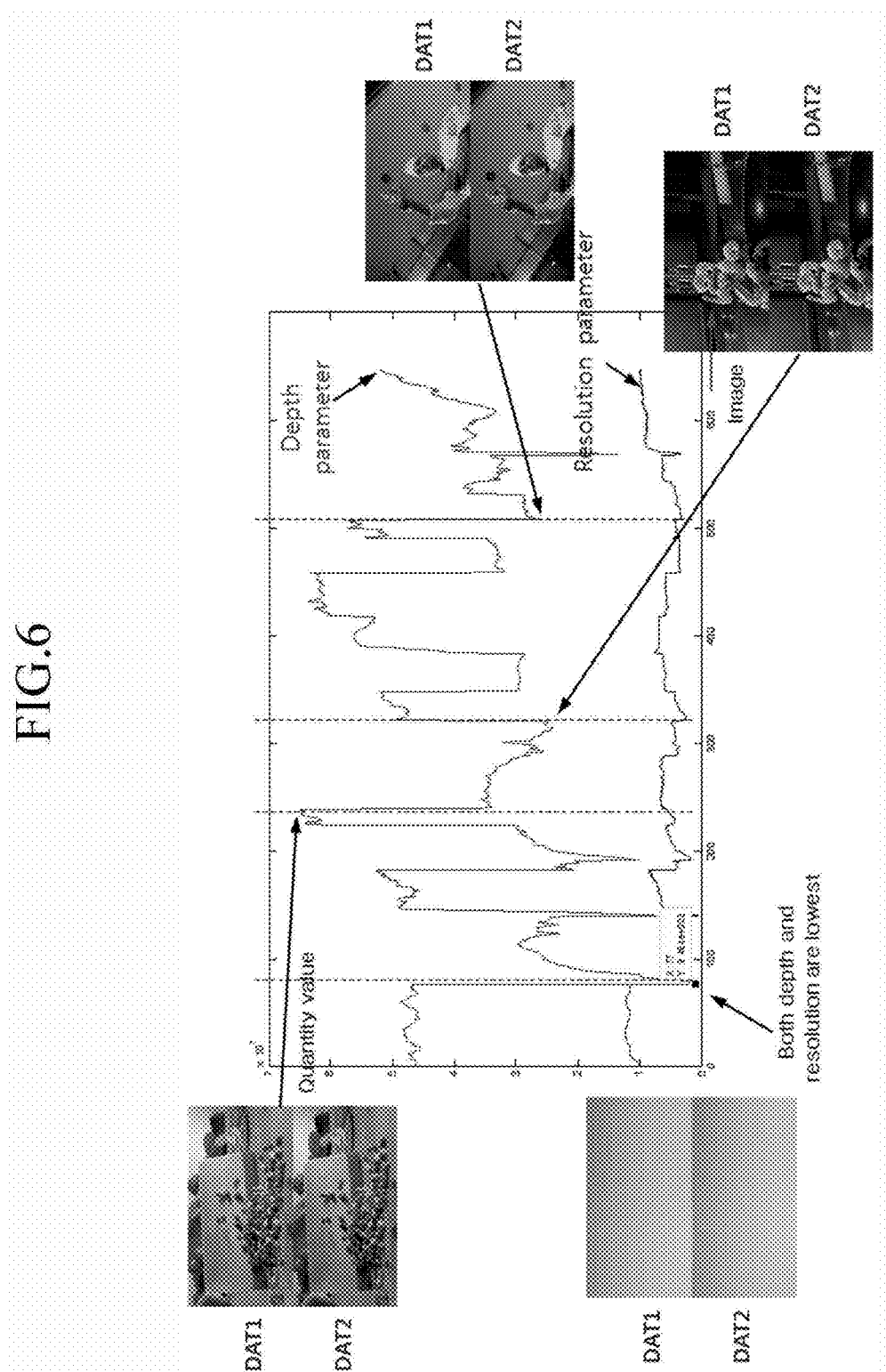
FIG. 6 is a graph illustrating examples of quantifying characteristics of an input image signal input to the display device according to an embodiment of the present invention.
Figure 7:
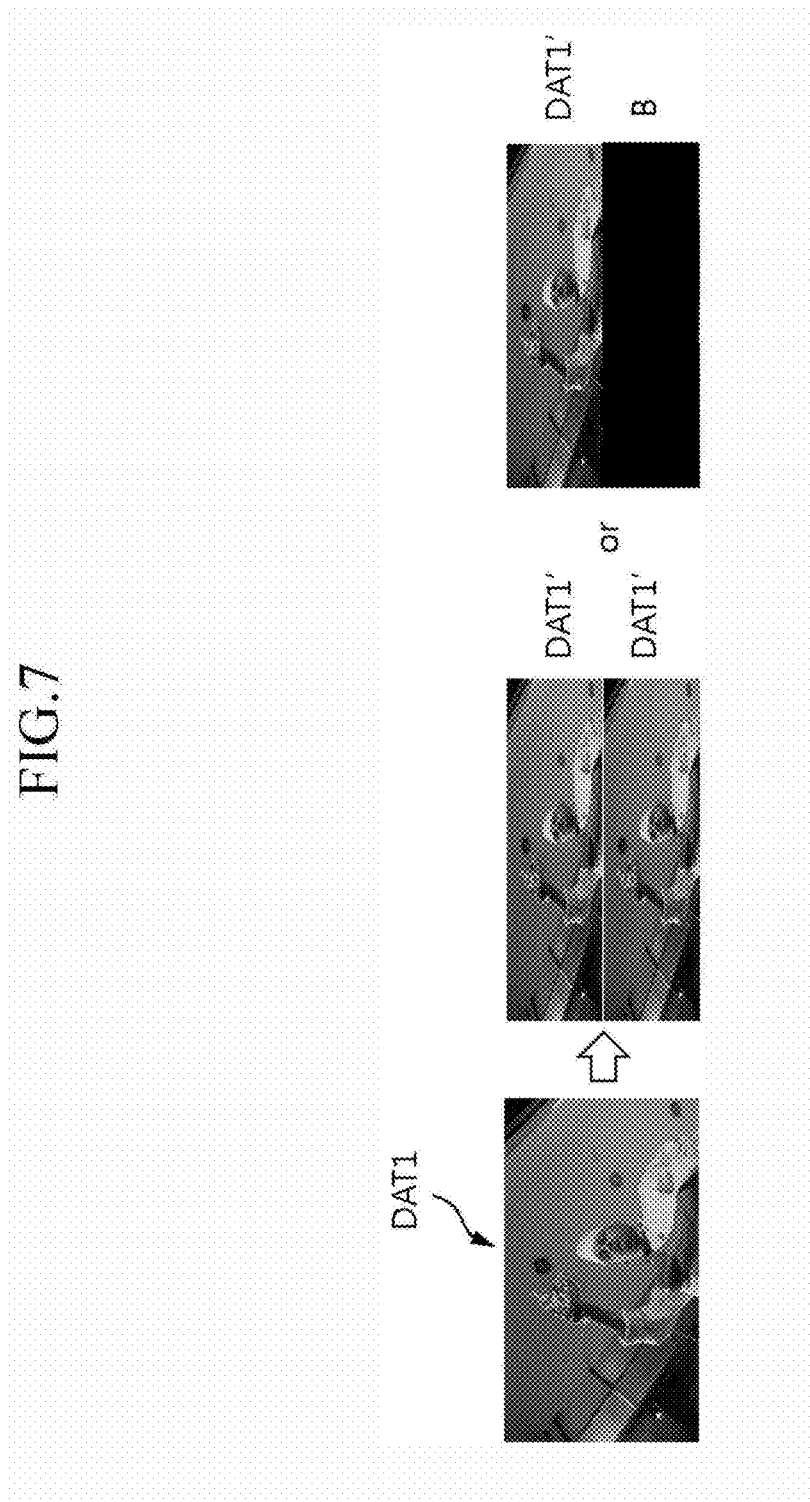
FIG. 7 is a diagram illustrating an example of an output image signal output from the signal controller of the display device according to an embodiment of the present invention.
Figure 8:
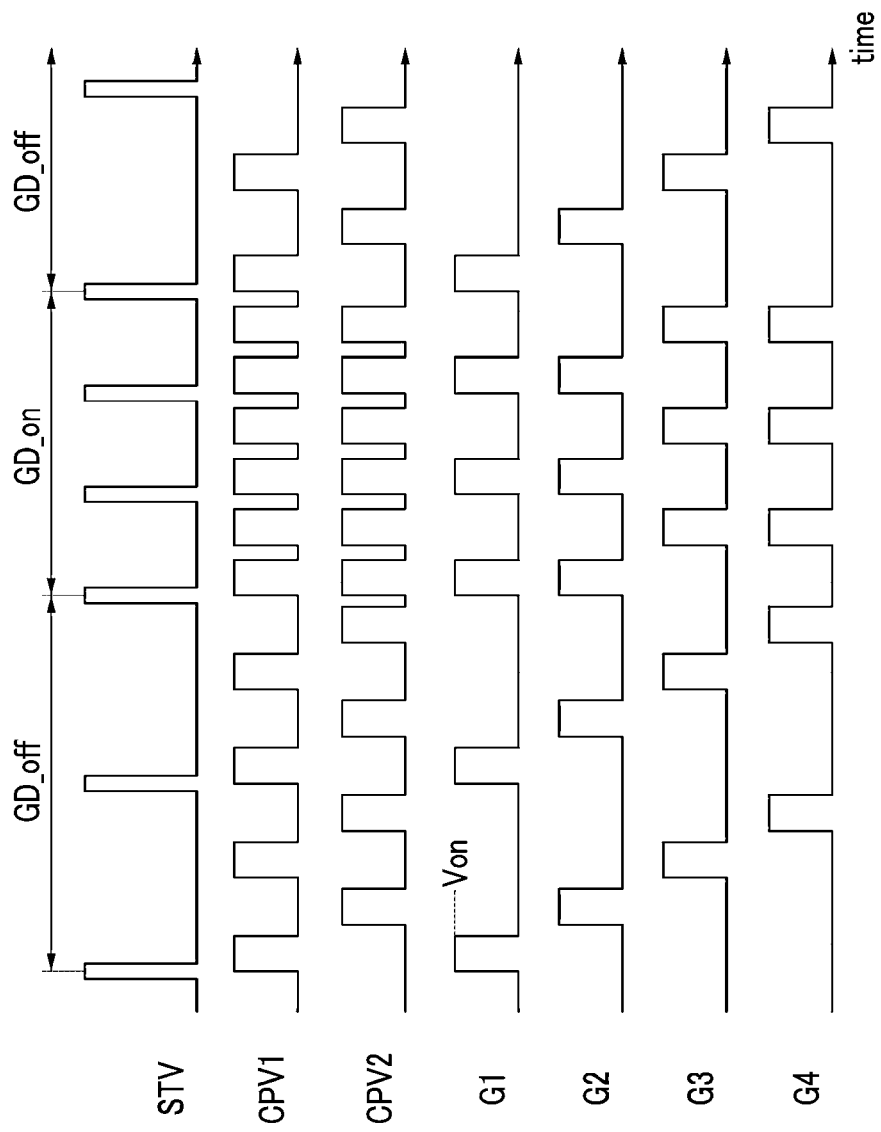
FIG. 8 is a timing diagram of a driving signal of the display device according to an embodiment of the present invention.
Figure 9:
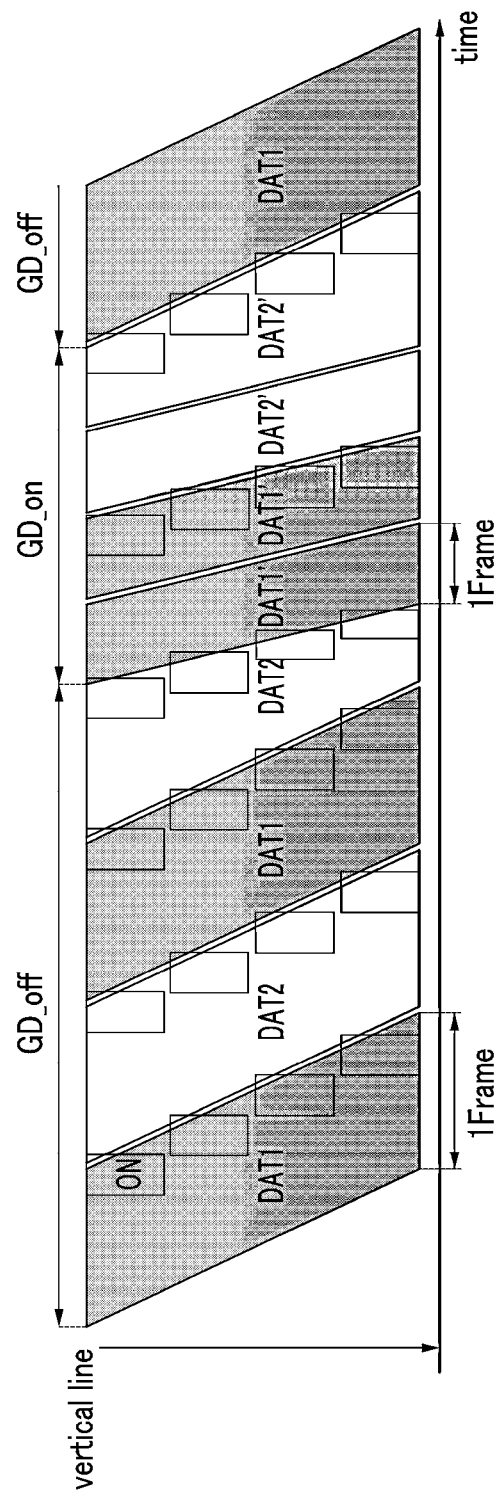
FIG. 9 is a timing diagram illustrating an input time of a data voltage for an output image signal and an on time when a backlight is turned on in the display device according to an embodiment of the present invention.
Figure 10:
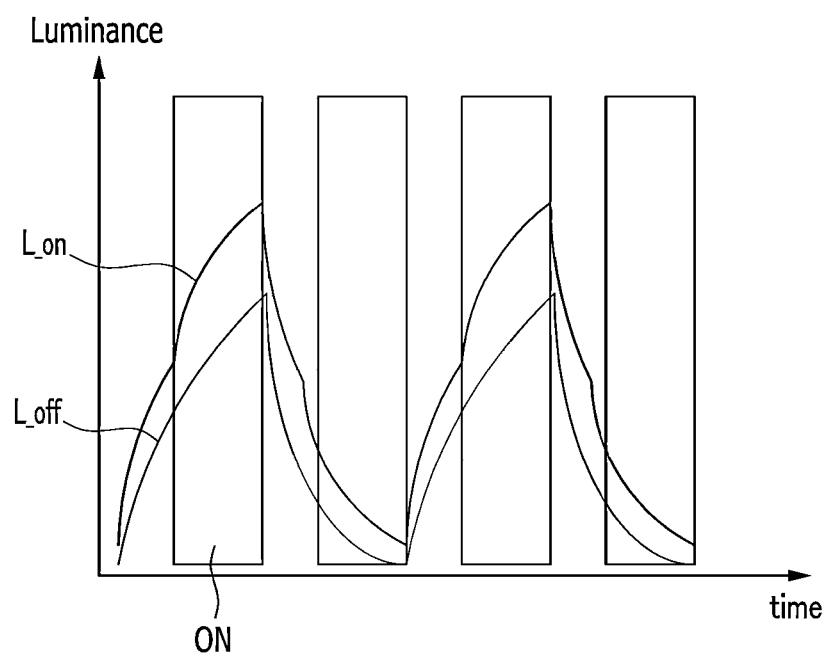
FIGS. 10 and 11 are graphs each illustrating a change in luminance according to input of a data voltage in the display device according to an embodiment of the present invention.
Figure 11:
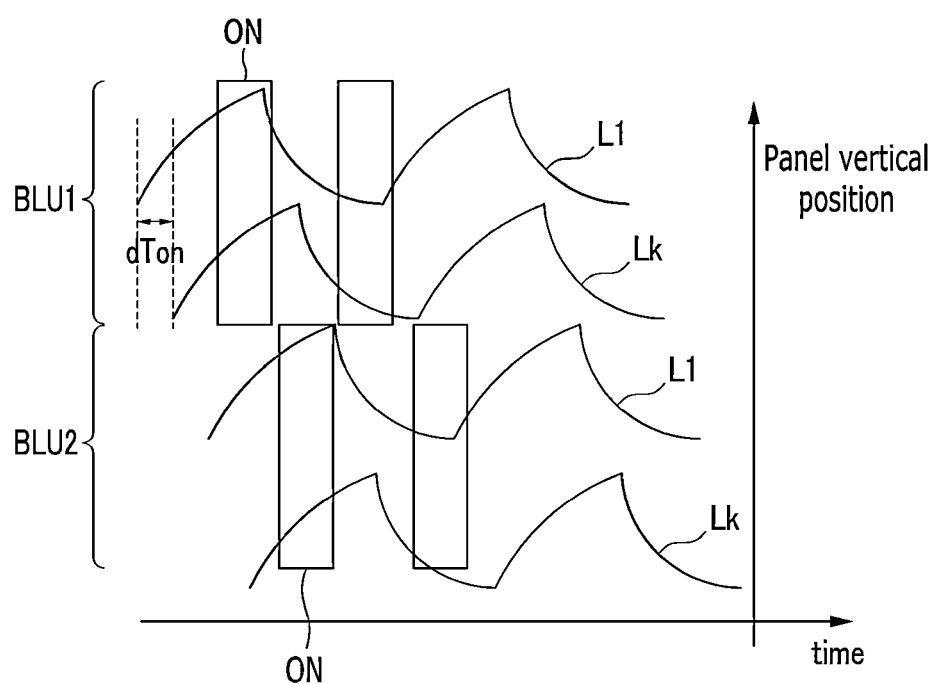

FIG. 5 is a flowchart illustrating a method of controlling a frame rate based on an input image signal in a display device (e.g., the display device discussed with reference to FIGS. 1 to 4) according to an embodiment of the present invention. FIG. 6 is a graph illustrating examples of quantifying characteristics of an input image signal input to the display device according to an embodiment of the present invention. FIG. 7 is a diagram illustrating an example of an output image signal output from the signal controller of the display device according to an embodiment of the present invention. FIG. 8 is a timing diagram of a driving signal of the display device according to an embodiment of the present invention. FIG. 9 is a timing diagram illustrating an input time of a data voltage for an output image signal and a time when a backlight is turned on in the display device according to an embodiment of the present invention. FIGS. 10 and 11 are graphs each illustrating a change in luminance according to input of a data voltage in the display device according to an embodiment of the present invention.

In the display device, a pixel PX may display different images for different viewpoints at different times, as discussed with reference to FIG. 4.

Referring to FIGS. 1 and 5, the graphic controller 700 may provide (or input) the input control signal ICON and the input image signal IDAT to the signal controller 600 (in step S11). In a 3D mode, the signal controller 600 may receive the 3D enable signal 3D_en from the graphic controller 700 to operate in the 3D mode.

The frame rate determining unit 610 of the signal controller 600 may determine a frame rate of the corresponding frame according to a characteristic of the image associated with the input image signal IDAT to determine whether gate doubling driving is required (in step S14). To this end, the frame rate determining unit 610 may quantify vertical resolution (in step S12) and/or may quantify depth information (in step S13) based on the input image signal IDAT. Characteristics of the image may include the vertical resolution and the depth information.

The vertical resolution is resolution in a column direction of the image to be displayed by the display panel 300. A vertical resolution quantity value for quantifying the vertical resolution may be calculated using, for example, the following [Equation 1].

$$\sum_{\text{all } x,y,RGB \text{ except } y \text{ (and)}} \text{abs} \quad [\text{Equation 1}]$$
$$(VW(x, y, RGB) - VW(x, y+1, RGB))$$

In [Equation 1], x represents a coordinate in a row direction, y represents a coordinate in a column direction, and VW represents a gray value of the input image signal IDAT for the first view point VW1 or the second view point VW2. The pixel PX may display one of primary colors, for example, red R, green G, and blue B. According to [Equation 1], the vertical resolution quantity value may be obtained by adding all absolute values of gray differences of input image signals IDAT in adjacent rows in each column with respect to each of the primary colors R, G, and B.

The depth information may be information on a depth of the 3D image, that is, a protruding or recessing degree of each portion of the perceived 3D, which may depend on a difference between images recognized at different viewpoints, particularly, adjacent viewpoints.

A depth information quantity value for quantifying the depth information may be calculated using, for example, the following [Equation 2].

$$\sum_{\text{all } x,y,RGB} \text{abs}(VW1(x, y, RGB) - VW2(x, y, RGB)) \quad [\text{Equation 2}]$$

In [Equation 2], x represents a coordinate in a row direction, y represents a coordinate in a column direction, VW1 represents a gray value of the input image signal IDAT for the first view point VW1, and VW2 represents a gray value of the input image signal IDAT for the second view point VW2. The pixel PX may display one of primary colors, for example, red R, green G, and blue B. According to [Equation 2], the depth information quantity value may be obtained by adding all absolute values of differences between gray values of input image signals IDAT for the first view point VW1 and gray values of input image signals IDAT for the second view point VW2 of each coordinate with respect to each of the primary colors R, G, and B. If the image at the first view point VW1 and the image at the second view point VW2 are the same as each other, the depth information quantity value may be 0. If a difference between the image at the first view point VW1 and the image at the second view point VW2 is large, the depth information quantity value may be large.

FIG. 6 illustrates vertical resolution quantity values and depth information quantity values associated with various examples (e.g., four examples) of the output image signal DAT1 for the first view point VW1 and the output image signal DAT2 for the second view point VW2. In FIG. 6, the vertical axis represents quantity values, and the horizontal axis represents different image signal pairs. The simpler the image is, the lower the vertical resolution quantity value is. Among the four examples, the image signal pair at the lower left portion of FIG. 6 has the lowest vertical resolution quantity value. If a difference between the image at the first view point VW1 and the image at the second view point VW2 is large, the depth information quantity value is large. Among the four examples, the image signal pair at the upper left portion of FIG. 6 has the largest depth information quantity value.

In one or more embodiments, the vertical resolution and/or the depth information may be quantified using various methods.

Referring back to FIG. 5, the frame rate determining unit 610 of the signal controller 600 may determine the frame rate using the vertical resolution quantity value and/or the depth information quantity value. The frame rate determining unit 610 may determine whether gate doubling is required using the input image signal IDAT of the vertical resolution quantity value and/or the depth information quantity value (in step S14).

In an embodiment, if the vertical resolution quantity value is larger than a predetermined reference value such that the vertical resolution needs to be higher than a reference resolution, the frame rate determining unit 610 may select double-off driving such that the gate driver 400 may perform doubling-off driving scanning at the first frame rate F1; otherwise, the frame rate determining unit 610 may select double-on driving such that the gate driver 400 may perform doubling-on driving scanning at the second frame rate F2.

If the depth information quantity value is larger than a predetermined reference value such that a response speed of the pixels PX needs to be increased and that cross talk between adjacent frames needs to be decreased, the frame rate determining unit 610 may select double-on driving such that the gate driver 400 may perform the doubling-on driving scanning at the second frame rate F2; otherwise, the frame rate determining unit 610 may select double-off driving such that the gate driver 400 may perform the doubling-off driving scanning at the first frame rate F1. That is, the frame rate determining unit 610 may determine the doubling-on driving, in which the frame rate is relatively high, for a frame in which the depth information is important.

According to an embodiment of the present invention, the frame rate determining unit 610 may determine whether the frame rate is selectively changed from the first frame rate F1 to the second frame rate F2 for every frame based on information of (and/or derived from) the input image signal IDAT.

If the frame rate determining unit 610 of the signal controller 600 selects the first frame rate F1 and/or selects doubling-off driving, the frame rate determining unit 610 may transmit the doubling-off driving instruction signal GD_off to the signal generator 670 (in step S22). Accordingly, the signal generator 670 may process the input image signal IDAT without compression to generate the output image signal DAT and may generate the gate control signal CONT1, the data control signal CONT2, the 3D image control signal CONT3, and the backlight control signal CONT4 in accordance with the first frame rate F1 (in step S23).

If the frame rate determining unit 610 of the signal controller 600 selects the second frame rate F2 and/or selects double-on driving, the frame rate determining unit 610 may transmit the doubling-on driving instruction signal GD_on to the middle frame determining unit 620, and the middle frame determining unit 620 may determine whether a middle frame (or intermediate frame) is required (in step S17).

For determining whether the middle frame is required, the middle frame determining unit 620 may quantify an inter-frame difference based on the input image signal IDAT (in step S15) and/or may quantify frame luminance (in step S16).

The inter-frame difference means a difference between adjacent frames of the input image signal IDAT for each coordinate. An inter-frame difference quantity value for quantifying the inter-frame difference may be calculated using, for example, the following [Equation 3].

$$\sum_{all\ x,y,RGB} \text{abs}(VW(x, y, RGB, (n-1)th\ \text{frame}) - VW(x, y, RGB, nth\ \text{frame})) \qquad [\text{Equation 3}]$$

In [Equation 3], x represents a coordinate in a row direction, y represents a coordinate in a column direction, VW represents a gray value of the input image signal IDAT for the first view point VW1 or the second view point VW2, (n−1)th frame represents an n−1-th frame (n is a natural number of 2 or more), and nth frame represents an n-th frame. The pixel PX may display one of primary colors, for example, red R, green G, and blue B. According to [Equation 3], the inter-frame difference quantity value may be obtained by adding all absolute values of gray differences of input image signals IDAT in adjacent frames in each coordinate with respect to each of the primary colors R, G, and B.

The frame luminance may be obtained by adding all grays of the input image signals IDAT of all the coordinates in each frame to calculate the luminance of the entire image displayed in each frame. A frame luminance difference quantity value for quantifying the frame luminance difference may be an absolute value of a difference between frame luminance of a current frame and frame luminance of a previous frame.

The middle frame determining unit 620 of the signal controller 600 may determine whether the middle frame is required before the frame rate is changed to the second frame rate F2 using the inter-frame difference quantity value and/or the frame luminance quantity value (in step S17).

In an embodiment, if the inter-frame difference quantity value is between a predetermined first reference value and a predetermined second reference value (i.e., in a predetermined range), for preventing or minimizing judder (or an undesirable instant motion picture phenomenon shown at the moment when the frame rate is changed), the middle frame determining unit 620 may determine that a middle frame is required when the frame rate is changed from the first frame rate F1 to the second frame rate F2. In an embodiment, when an image displayed in a plurality of adjacent frames is a motion picture including an object that moves at a constant velocity, a middle frame may be provided for preventing or minimizing shudder when the frame rate is changed.

If the inter-frame quantity value is smaller than the predetermined first reference value or larger than the predetermined second reference value (i.e., outside the predetermined range), since the image displayed in the plurality of adjacent frames is close to a still image or is changed into a completely different image, no middle frame may be required.

In an embodiment, if the frame luminance quantity value is larger than a predetermined reference value, since the image may be completely changed, the middle frame determining unit 620 may determine that no middle frame is required; if the frame luminance quantity value is smaller than or equal to the predetermined reference value, the middle frame determining unit 620 may determine that a middle frame is required.

If the middle frame determining unit 620 determines that a middle frame is required, the middle frame generator 630 of the signal controller 600 may generate middle frame information MFS for generation of the middle frame (in step S18). The middle frame may include a hold period generated by delaying the vertical start signal STV. The middle frame will be described below in more detail.

The middle frame generator 630 (and/or the frame rate controller 650) of the signal controller 600 may transmit the middle frame information MFS and the doubling-on driving instruction signal GD_on to the signal generator 670 (in step S19). According to the middle frame information MFS and the doubling-on driving instruction signal GD_on, the signal generator 670 may compress and process the input image signal IDAT to generate the output image signal DAT and may generate the gate control signal CONT1, the data control signal CONT2, the 3D image control signal CONT3, the backlight control signal CONT4, etc. in accordance with the second frame rate F2 (in step S21).

If the middle frame determining unit 620 determines that a middle frame is required, the middle frame generator 630 and/or the signal generator 670 may generate the output image signal DAT for the middle frame based on the middle frame information MFS and may delay the vertical start signal STV of the gate control signal CONT1 for a predetermined time.

If the middle frame determining unit 620 determines that no middle frame is required, the middle frame determining unit 620 (and/or the frame rate controller 650) may transmit the doubling-on driving instruction signal GD_on (with no middle frame) to the signal generator 670 (in step S20). According to the doubling-on driving instruction signal GD_on, the signal generator 670 may compress and process the input image signal IDAT to generate the output image signal DAT and may generates the gate control signal CONT1, the data control signal CONT2, the 3D image control signal CONT3, the backlight control signal CONT4, etc. in accordance with the second frame rate F2 (in step S21).

Referring to FIG. 7, in an embodiment, if the image is displayed at the first frame rate F1 for the first view point VW1, the output image signal DAT1 may include data for the entire row. If doubling-on driving is performed, the signal generator 670 of the signal controller 600 may compress the input image signal IDAT to generate a compressed output image signal DAT1' having resolution lower than the output image signal DAT and may allocate the compressed output image signal DAT1' to each of N frames corresponding to one input image signal IDAT, wherein N is equal to the frame rate multiplier and is a positive integer. Alternatively, the signal generator 670 may allocate the compressed output image signal DAT1' to first one or more frames among the N frames and may allocate a black image signal B to the remaining frame(s). In an embodiment, the second frame rate F2 for one input image signal IDAT is two times of the first frame rate F1 (N=2), the compressed output image signal DAT1' may have substantially ½ resolution of the output image signal DAT1.

The signal controller 600 may transmit the gate control signal CONT1 to the gate driver 400, may transmit the data control signal CONT2 and the output image signal DAT to the data driver 500, may transmit the 3D image control signal CONT3 to the 3D image conversion member 60, and may transmit the backlight control signal CONT4 to the backlight controller 950.

FIG. 8 illustrates timing of control signals in an embodiment where the second frame rate F2 is substantially two times of the first frame rate F1. In an embodiment, the gate clock signal may include a first gate clock signal CPV1 for controlling an output period of the gate-on voltages Von applied to odd numbered gate lines G1, G3, etc. and may include a second gate clock signal CPV2 for controlling an output period of the gate-on voltages Von applied to even numbered gate lines G2, G4, etc.

Referring to FIG. 8, a pulse period (e.g., the time between two consecutive rising edges) of the vertical start signal STV in a doubling-on driving period is substantially 1/N (e.g., ½) of a pulse period in a doubling-off driving period.

In the doubling-off driving period, the pulses of the first gate clock signal CPV1 may not synchronize with the pulses of the second gate clock signal CPV2. In the doubling-on driving period, the pulses of the first gate clock signal CPV1 may synchronize with the pulses of the second gate clock signal CPV2. In the doubling-off driving period, a difference between a phase of the first gate clock signal CPV1 and a phase of the second gate clock signal CPV2 may be substantially 180°. In an embodiment, the number of gate clock signals CPV may not be 2, and/or the phase difference(s) may be or may include a value different from 180°.

The pulse period of each of the gate clock signals CPV1 and CPV2 in the doubling-on driving period may be substantially 1/N (e.g., ½) of a pulse period in the doubling-off driving period.

The gate driver 400 sequentially applies gate-on voltages Von to the gate lines G1-Gn according to the gate control signal CONT1, which may include the vertical start signal STV and the gate clock signals CPV1 and CPV2.

In the doubling-off driving period, the gate-on voltages Von may be sequentially output to the gate lines G1-Gn by a unit of one gate line, such that only one gate line receives a gate-on voltage at a time. In the doubling-on driving period, the gate-on voltages Von may be sequentially output to the gate lines G1-Gn by a unit of two or more gate lines, such that two or more gate lines may substantially simultaneously receive gate-on voltages. In the doubling-off driving period, timings at which the gate-on voltages Von are applied to the adjacent gate lines G1-Gn are different from each other. In the doubling-on driving period, gate-on voltages Von are simultaneously applied to two or more adjacent gate lines G1-Gn. FIG. 8 illustrates an example in which gate-on voltages Von are simultaneously applied to a pair of adjacent gate lines.

In an embodiment, conversion between the doubling-on driving and the doubling-off driving may be implemented by changing the control signal, such as the gate control signal CONT1 in the signal controller 600, without changing hardware.

When the gate-on voltages Von are applied to the gate lines G1-Gn, the switching elements connected thereto are turned on.

The data driver 500 may receive output image signals DAT for pixels PX in one row according to the data control signal CONT2, may select a gray voltage corresponding to each output image signal DAT to convert the output image signal DAT into an analog data voltage Vd, and may then apply the converted data voltage Vd to the corresponding data line D1-Dm.

The output image signal DAT in the doubling-off driving period may be an output image signal DAT1 for the first view point VW1 or an output image signal DAT2 for the second view point VW2. The output image signal DAT in the doubling-on driving period may be a compressed output image signal DAT1' for the first view point VW1 or a compressed output image signal DAT2' for the second view point VW2. In an embodiment, the compressed output image signal DAT1' for the first view point VW1 and/or the compressed output image signal DAT2' for the second view point VW2 in the doubling-on driving may be repetitively received throughout N sequential frames. In an embodiment, the compressed output image signals DAT1' and DAT2' may be received in first one or more frames among the M frames, and the black image signal B may be received in the remaining frames.

Referring to FIG. 9, in the doubling-off driving period where the image is displayed at the first frame rate F1, data voltages of the output image signal DAT1 for the first view point VW1 and the output image signal DAT2 for the second view point VW2 are alternately input to the display panel 300 frame by frame.

In an embodiment, in the doubling-on driving period, where the image is displayed at the second frame rate F2, a data voltage for the compressed output image signal DAT1' for the first view point VW1 is repeatedly input to the display panel 300 N times for N (e.g., N=2) consecutive frames, and then a data voltage for the compressed output image signal DAT2' for the second view point VW2 is repeatedly input to the display panel 300 N times for N consecutive frames. In an embodiment, a data voltage for the black image signal B may be input to the display panel 300 in a second frame of two consecutive frames for one input image signal IDAT.

When data voltages Vd are applied to the data lines D1-Dm of the display panel 300, the data voltages Vd are applied to corresponding pixels PX through turned-on switching elements. When a data voltage Vd is applied to a pixel PX, the pixel PX may display luminance according to configuration of one or more optical conversion elements, such as orientations of liquid crystals in a liquid crystal layer, which may be controlled by the data voltage Vd. As a result, luminance corresponding to the gray of the input image signal IDAT may be displayed.

The backlight 900 according to an embodiment of the present invention may include a plurality of light emitting blocks arranged in a column direction (which is a vertical direction) and independently driven to emit light. This is called a scan backlight. In an embodiment, the backlight 900 may further include at least one straight light guide plate that overlaps the display panel 300.

FIG. 9 illustrates an example in which the backlight 900 may include four light emitting blocks that are arranged in a column direction and can be driven independently. The light emitting blocks of the backlight 900 may be sequentially turned on from the top in synchronization with driving timing of the gate driver 400 and the data driver 500. When the frame rate is changed, an ON timing, i.e., timing for starting an ON time period, of the backlight 900 may be changed in accordance with the frame rate change.

For providing sufficient luminance and/or for saving energy, ON time periods of the backlight 900 may overlap only the last portion of each frame, such that light is provided after the pixel PX has sufficiently responded to the data voltage Vd, for example, after the orientations of the liquid crystal have changed and have stabilized. That is, an ON time period of the backlight 900 may start after the data voltage Vd has been applied to the pixel PX for a predetermined time length. The ON timing may be determined according to a response speed of the optical conversion elements, e.g., a response speed of the liquid crystal layer, so that crosstalk may be minimized or prevented.

The 3D image conversion member 60 may operate in synchronization with charging timings of the pixels PX and/or the ON timings of the backlight 900 in the display panel 300. In an embodiment, when the frame rate is changed, the on/off timing of the 3D image conversion member 60, e.g., the shutter glasses 60a may be changed in accordance with the corresponding frame rate. As a result, images for different viewpoints, which are alternately displayed by the pixel PX of the display panel 300, may be timely viewed at each view point.

According to an embodiment of the present invention, in order to prevent excessively frequent conversion between the doubling-on driving and the doubling-off driving, when the driving mode is changed once, the state may be maintained for a predetermined number of sequential (and/or consecutive) frames.

Referring to FIG. 9, when the frame rate is changed from the first frame rate F1 to the second frame rate F2, in the upper portion of the display panel 300, since the response time of the pixel PX sufficiently has elapsed when a corresponding upper light block of the backlight 900 is turned on, an image with target luminance and desirable quality may be recognized. However, when the frame rate is changed from the first frame rate F1 to the second frame rate F2, in the lower portion of the display panel 300, if the response time of the pixel PX has not sufficiently elapsed when a corresponding lower light block of the backlight 900 is turned on, the image with target luminance may not be sufficiently recognized, and the image of the previous frame may be at least partially recognized together, such that crosstalk may occur.

According to embodiments of the invention, as illustrated in FIG. 9, in a frame just before the frame rate is changed from the first frame rate F1 to the second frame rate F2, an on ON time period of the lower light emitting block positioned at the lower portion of the backlight 900 (e.g., the bottom portion of the backlight 900) may be shorter than an ON time period of the upper light emitting block positioned at the upper portion of the backlight 900 (e.g., the top portion of the backlight 900. Advantageously, crosstalk may be minimized or prevented. In an embodiment, in order to compensate for the shortened ON time period, the driving current for the lower light emitting block is stronger than the driving current for the upper light emitting block, such that luminance values at different positions may be substantially equalized.

Referring to FIG. 10, when the compressed output image signals DAT1' and DAT2' are continuously displayed throughout the plurality of frames at the second frame rate F2 with respect to one input image signal IDAT, since the same data voltage is continuously input to the display panel 300, the pixel PX is charged many times and thus the response speed increases, and luminance L_on during the doubling-on driving period may be increased faster than luminance L_off during the doubling-off driving period, and the crosstalk between consecutive frames may be reduced.

According to an embodiment of the present invention, if luminance needs to be increased or if crosstalk needs to be minimized or prevented, doubling-on driving may be performed at the second frame rate F2 with different ON time period lengths and/or different driving current strengths configured for different light blocks at different positions. If a high-resolution image needs to be displayed, the image may be displayed at the first frame rate F1. A suitable frame rate may be actively selected according to characteristics of images. Advantageously, images may be displayed with optimal quality for substantially every frame without a substantial change to the hardware of the driving apparatus of the display device.

An increase in the luminance L_on during the doubling-on driving and the crosstalk reduction may be controlled by adjusting the ON time period (i.e., the duty cycle) of the backlight 900.

In an embodiment, in a doubling-on driving period, the data voltage for the black image signal B may be applied to the display panel 300 in the last frame among the plurality of frames for one input image signal IDAT, such that the optical conversion elements may sufficiently change configurations before a frame for a next input image signal IDAT starts. Advantageously, crosstalk between adjacent frames may be minimized or prevented.

Referring to FIG. 11, in an embodiment, the backlight 900 includes a plurality of light emitting blocks BLU1, BLU2, etc. When a scanning speed increases given that the gate driver 400 is driven at the second frame rate F2, a difference dTon between a charging start time of a first pixel row and a charging start time of the last pixel row corresponding to each of the light emitting blocks BLU1, BLU2, etc. may be decreased. Accordingly, a difference between the pixel charging times of the pixel rows corresponding to each of the light emitting blocks BLU1, BLU2, etc. may be decreased. A difference between luminance L1 of the first pixel row and luminance Lk of the last pixel row among the pixel rows corresponding to each of the light emitting blocks BLU1, BLU2, etc. may be decreased. Advantageously, crosstalk deviation may be minimized. ON time periods of the backlight 900 may be controlled for minimizing crosstalk.

Figure 12:
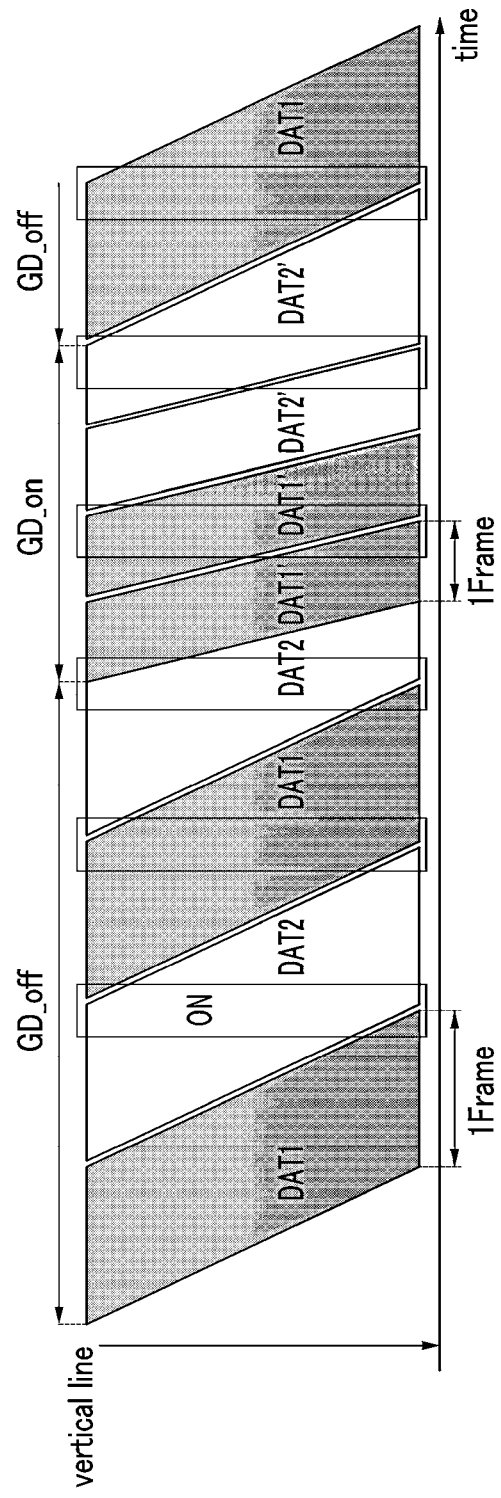
FIG. 12 is a timing diagram illustrating an input time of a data voltage for an output image signal and a time when a backlight is turned on in the display device according to an embodiment of the present invention.

FIG. 12 is a timing diagram illustrating an input time of a data voltage for an output image signal and time periods when a backlight is turned on in an display device according to an embodiment of the present invention. The display device may have one or more elements and features discussed above with references to one or more of FIGS. 1 to 11.

Referring to FIG. 12, the backlight 900 according to an embodiment of the present invention is not divided into a plurality of light emitting blocks and may be turned on or off with respect to the entire display panel 300. This is called a blinking backlight.

During the doubling-off driving, the scanning time is relatively long, and thus a difference between a response timing of the upper pixel PX and a response timing of the lower pixel PX may be substantially large. In an embodiment, each On time period of the blinking backlight may start at an end portion of a frame that correspond to one or more lower pixel rows, for minimizing crosstalk between consecutive frames.

During the doubling-on driving, the scanning time is relatively short, and thus the difference between the response time of the upper pixel PX of the display panel 300 and the response time of the lower pixel PX is decreased. Further, since the pixels PX is charged many times with respect to the same input image signal IDAT, the response speed of the pixels PX is increased. Accordingly, although the blinking backlight is used, the image displayed by the lower pixel PX of the display panel 300 may come close to target luminance, and the crosstalk with the previous frame is substantially decreased. In an embodiment, the backlight 900 may be a blinking backlight, and the second frame rate F2 is selected for frames that need substantial reduction of crosstalk.

In an embodiment, the backlight 900 may be a blinking backlight. During the doubling-on driving, power consumption may be reduced by decreasing the ON time period lengths of the backlight 900.

Figure 13:
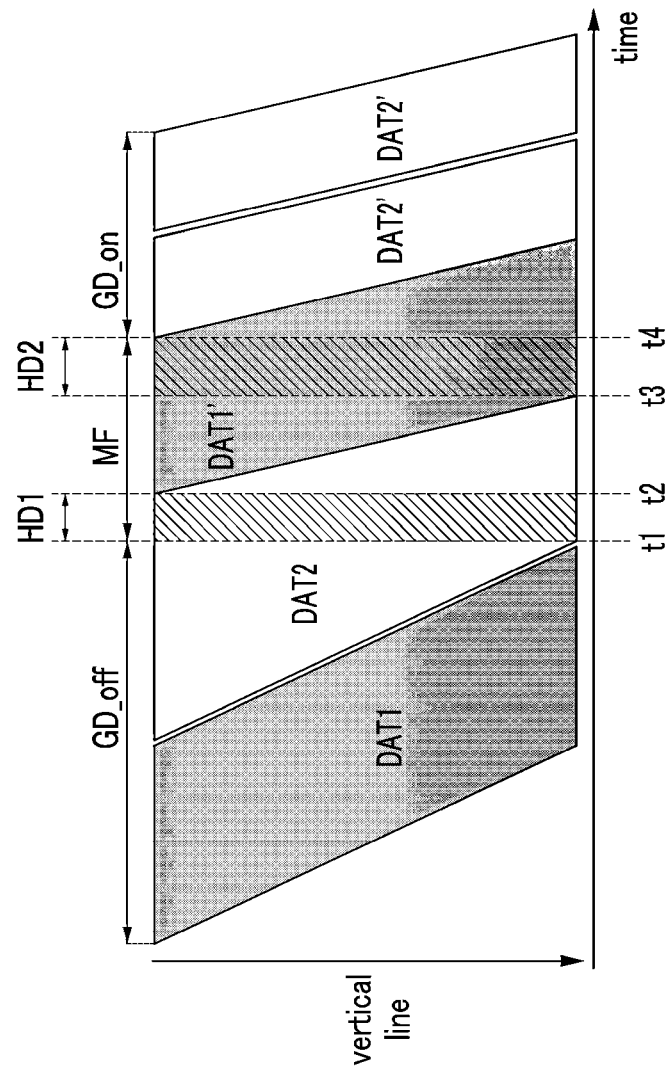
FIG. 13 is a timing diagram illustrating an input time of a data voltage for an output image signal of the display device according to an embodiment of the present invention.
Figure 14:
FIG. 14 is a diagram illustrating an example of an output image signal output from the signal controller included in the display device according to an embodiment of the present invention.

FIG. 13 is a timing diagram illustrating an input time of a data voltage for an output image signal of the display device according to an embodiment of the present invention. FIG. 14 is a diagram illustrating an example of an output image signal output from the signal controller included in the display device according to an embodiment of the present invention. The display device may have one or more elements and features discussed above with references to one or more of FIGS. 1 to 12.

Referring to FIGS. 13 and 14, a middle frame MF (or intermediate frame MF) may be inserted in the middle and/or between a doubling-off driving period and a doubling-on driving period, when the frame rate is converted from the first frame rate F1 to the second frame rate F2.

When the frame rate is converted from the first frame rate F1 to the second frame rate F2, a middle frame MF may substantially prevent or minimize undesirable judder during the frame rate change. Particularly, when an image displayed in a plurality of adjacent frames is a motion picture including an object moving at a constant velocity, a middle frame MF may advantageously prevent or minimize potential judder when the frame rate is changed.

Referring to FIG. 9 described above, when the frame rate is changed from the first frame rate F1 to the second frame rate F2, an upper pixel PX positioned at an upper portion of the display panel 300 may be given a relatively sufficient response time, but a lower pixel PX positioned at a lower portion of the display panel 300 may be given a relatively short response time. Embodiments of the invention may substantially prevent or minimize image defect potentially caused by the difference.

In an embodiment, referring to FIG. 13, a pulse of the vertical start signal STV is delayed for a first hold period HD1 of a predetermined time length from a first time t1 to a second time t2, before the data voltages of the compressed output image signals DAT1' and DAT2' are input at the second frame rate F2. Accordingly, the lower pixel PX may be given additional time to respond, and the response time difference of the upper pixel PX and the lower pixel PX, which are charged at data voltages for the output image signal DAT2 input to the last frame of the doubling-off driving period, may be substantially decreased by the length of the first hold period HD1.

Referring to FIGS. 13 and 14, a dummy image signal DAT_dm may be input to the data driver 500 for the first hold period HD1. The dummy image signal DAT_dm may be an output image signal DAT of a predetermined grayscale, such as black.

In response to the pulse of the vertical start signal STV, which is input when the first hold period HD1 ends, the compressed output image signal(s) DAT1' (and/or DAT2') may be input to the data driver 500 at the second frame rate F2, and then the data voltage Vd therefore is input to the display panel 300. The application of the data voltage Vd to the pixels PX in the last row may end at a third time t3.

When the application of the data voltage Vd ends, the pulse of the vertical start signal STV for the next frame may be delayed for a second hold period HD2 of a predetermined time length from the third time t3 to a fourth time t4. Accordingly, a time period in which the first frame is driven at the second frame rate F2 may be increased by the second hold period HD2. A dummy image signal DAT_dm may be input to the data driver 500 for the second hold period HD2.

Given the second hold period HD2, a difference in response time lengths or charging voltage maintaining time lengths of the upper and lower pixels PX may be decreased when the frame rate is changed, and a difference in charging voltage maintaining time lengths of the pixels PX between the frames is increased. As a result, perceivable judder may be reduced or prevented.

A frame including the first hold period HD1 at the time when the frame rate is converted is called a middle frame MF. The middle frame MF may or may not include the second hold period HD2. The first hold period HD1 may be implemented when the frame rate is changed from the first frame rate F1 to the second frame rate F2 and/or changed from the second frame rate F2 to the first frame rate F1. The second hold period HD2 may be implemented when the frame rate is changed from the first frame rate F1 to the second frame rate F2 and/or changed from the second frame rate F2 to the first frame rate F1.

A length of the first hold period HD1 or the second hold period HD2 may be substantially equal to a product calculated from multiplying the number of pixel rows allocated for displaying dummy image signal DAT_dm by 1 horizontal period 1H.

Figure 15:
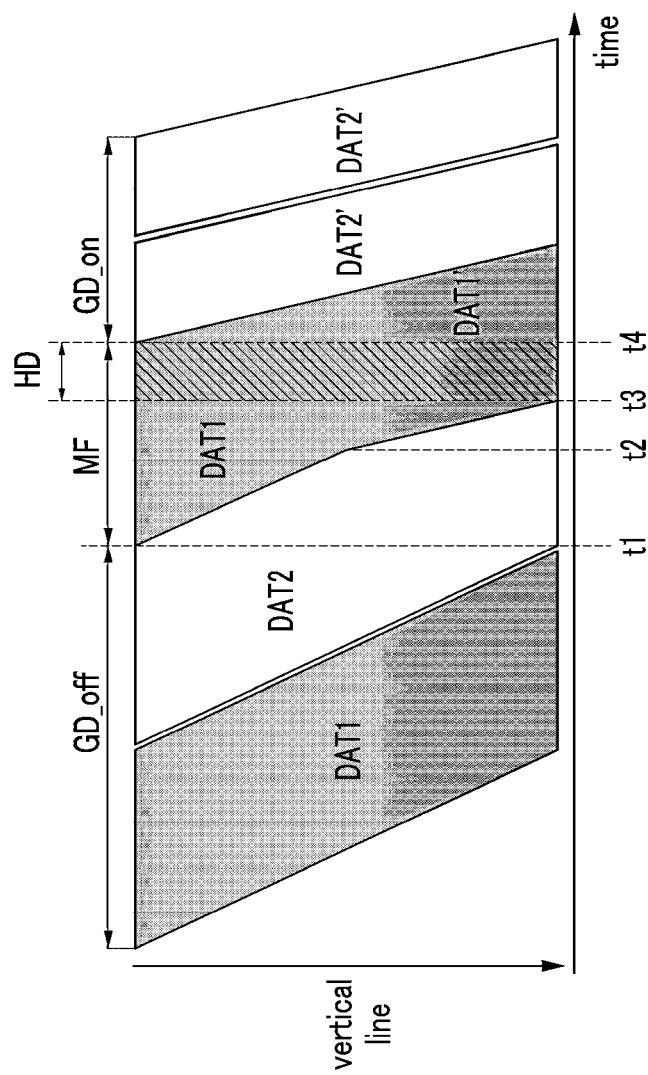
FIG. 15 is a timing diagram illustrating an input time of a data voltage for an output image signal of the display device according to an embodiment of the present invention.
Figure 16:
FIG. 16 is a diagram illustrating an example of an output image signal output from the signal controller included in the display device according to an embodiment of the present invention.

FIG. 15 is a timing diagram illustrating an input time of a data voltage for an output image signal of the display device according to an embodiment of the present invention. FIG. 16 is a diagram illustrating an example of an output image signal output from the signal controller included in the display device according to an embodiment of the present invention. The display device may have one or more elements and features discussed above with references to one or more of FIGS. 1 to 14. Referring to FIGS. 15 and 16, a middle frame MF (or intermediate frame MF) in which doubling-off driving and doubling-on driving are combined may be inserted in the middle and/or between a doubling-off driving period and a double-on driving period, when the frame rate is converted from the first frame rate F1 to the second frame rate F2.

Before the data voltages of the compressed output image signals DAT1' and DAT2' are input to the display panel 300 at the second frame rate F2, the data voltages Vd for the output image signals DAT1 and DAT2 are input to a partial region of the display panel 300 at the first frame rate F1 for the time from the first time t1 to the second time t2, and the data voltages Vd for the compressed output image signal(s) DAT1' (and/or DAT2') may be input to the remaining lower region of the display panel 300 at the second frame rate F2 for the time from the second time t2 to the third time t3. Accordingly, the response time difference of an upper pixel PX and a lower pixel PX, which are charged at data voltages for the output image signal DAT2 input to the last frame of the doubling-off driving period, may be decreased.

The pulse of the vertical start signal STV for the next frame may be delayed for a hold period HD of a predetermined time length from the third time t3 to a fourth time t4. As a result, the time length of the middle frame MF may be increased by the hold period HD. A dummy image signal DAT_dm may be input to the data driver 500 for the hold period HD.

Given the hold period HD provided in the middle frame MF, a difference in response time lengths or charging voltage maintaining time lengths of the upper and lower pixels PX may be decreased when the frame rate is changed, and a difference in charging voltage maintaining time lengths of the pixels PX between the frames is increased. As a result, perceivable judder may be reduced or prevented.

A frame in which a region (e.g., an upper portion) of the display panel 300 is driven at the first frame rate F1 and the remaining region (e.g., a lower portion) is driven at the second frame rate F2 at the time when the frame rate is converted is called a middle frame MF. The middle frame MF may or may not include a hold period HD. The hold period HD may be implemented where/when the frame rate is changed from the first frame rate F1 to the second frame rate F2 and/or changed from the second frame rate F2 to the first frame rate F1.

A length of the hold period HD may be substantially equal to a product calculated from multiplying the number of pixel rows allocated for displaying dummy image signal DAT_dm by 1 horizontal period 1H.

Figure 17:
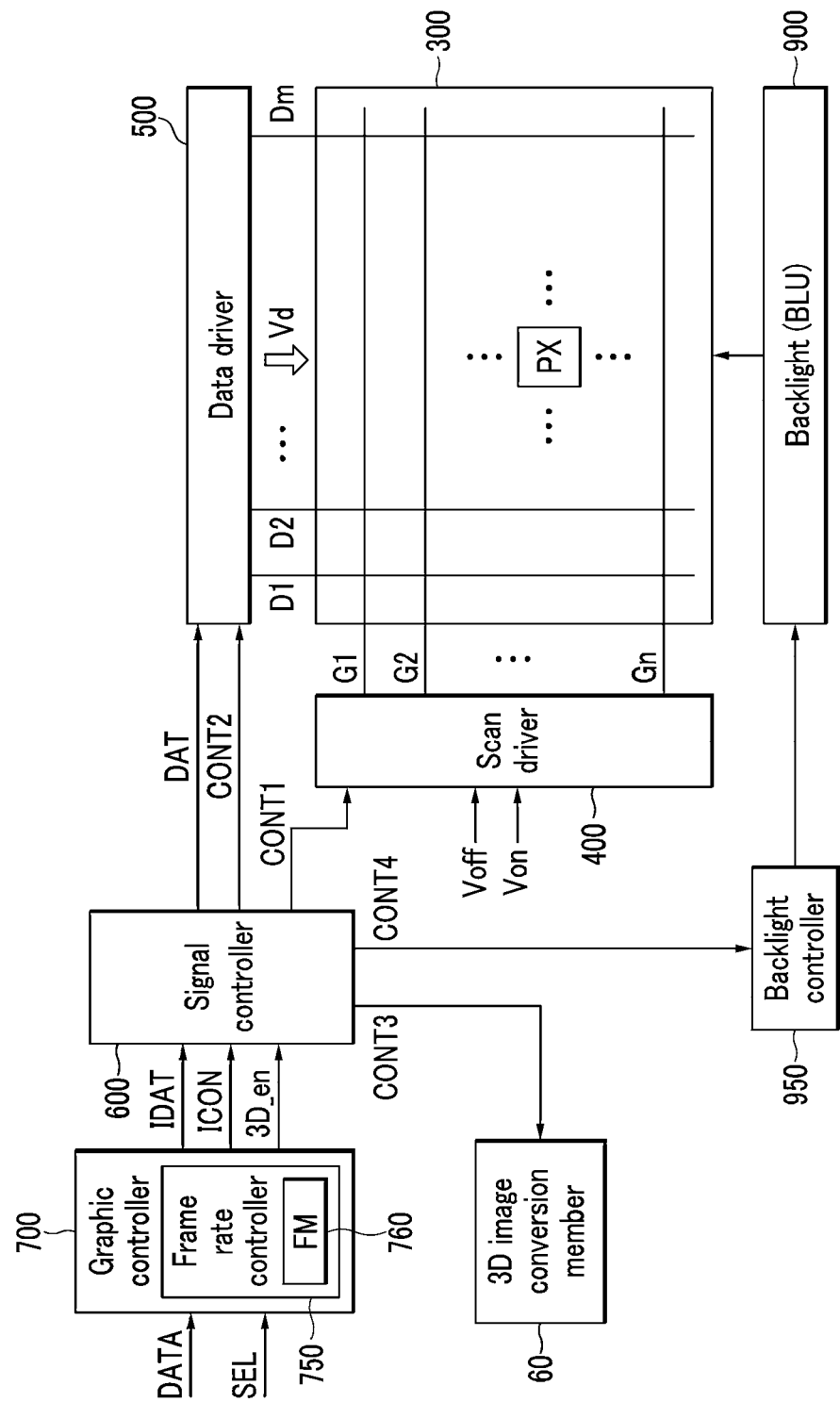
FIGS. 17, 18, and 19 are block diagrams illustrating one or more display devices according to one or more embodiments of the present invention.
Figure 18:
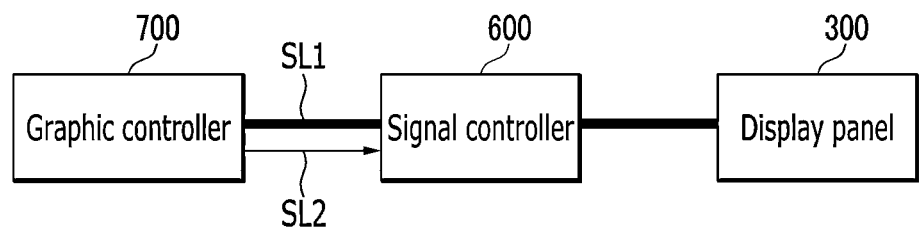
Figure 19:
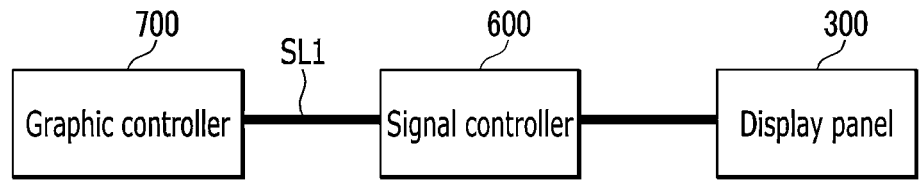
Figure 20:
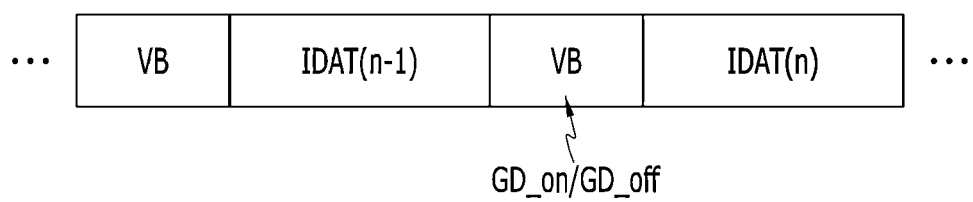
FIG. 20 is a diagram illustrating an input image signal input to a signal controller of the display device according to an embodiment of the present invention.

FIGS. 17, 18, and 19 are block diagrams illustrating one or more display devices according to one or more embodiments of the present invention. FIG. 20 is a diagram illustrating an input image signal input to a signal controller of a display device according to an embodiment of the present invention.

Referring to FIG. 17, the display device according to an embodiment of the present invention is almost the same as that of an embodiment illustrated in FIGS. 1 to 3 described above, but the graphic controller 700 may include a frame rate controller 750. In this case, the signal controller 600 does not include the frame rate controller 650. The one or more display devices may have one or more elements and features discussed above with references to one or more of FIGS. 1 to 16.

The frame rate controller 750 may have elements and/or features that are analogous to or identical to elements and/or features of the frame rate controller 650 described above. The frame rate controller 750 may include a frame memory 760 for storing an input image signal IDAT of a previous frame. The frame memory 760 may have elements and/or features that are analogous to or identical to elements and/or features of the frame memory 660 described above.

In an embodiment, information related to doubling-on driving and doubling-off driving may be generated by the graphic controller 700, and the information related to gate doubling may be transferred to the signal controller 600.

In an embodiment, as illustrated in FIG. 18, between the graphic controller 700 and the signal controller 600, a wiring SL1 (or first signal line SL1) may be provided for transmitting the input image signal IDAT and the input control signal ICON, and a separate wiring SL2 (or a second signal line SL2) may be provided for transmitting the information related to gate doubling to the signal controller 600. The information related to gate doubling may include a doubling-on driving instruction signal GD_on and/or a doubling-off driving instruction signal GD_off. For performing gate doubling, the signal controller 600 may operate according to the doubling-on driving instruction signal GD_on. According to the doubling-off driving instruction signal GD_off, the signal controller 600 may not perform gate doubling.

Referring to FIG. 19, according to an embodiment, a first signal line SL1 may be implemented between the graphic controller 700 and the signal controller 600 for transmitting the input image signal IDAT and for transmitting information related to gate doubling. Referring to FIG. 20, information related to gate doubling for a subsequent frame may be included in/as an input image signal for a vertical blank period VB implemented between data IDAT(n−1) and IDAT (n) (wherein n is a frame identifier and is a natural number of 2 or more) of adjacent frames among input image signals IDAT provided from the graphic controller 700 to the signal controller 600.

In addition, many features of an embodiments described above may be equally applied to the display device according to an embodiment.

A display device and a driving method thereof according to an embodiment of the present invention will be described with reference to FIG. 21, FIG. 22, and one or more of FIGS. 1 to 20 (e.g., FIGS. 1 to 3 or FIGS. 17 to 20).

Figure 21:
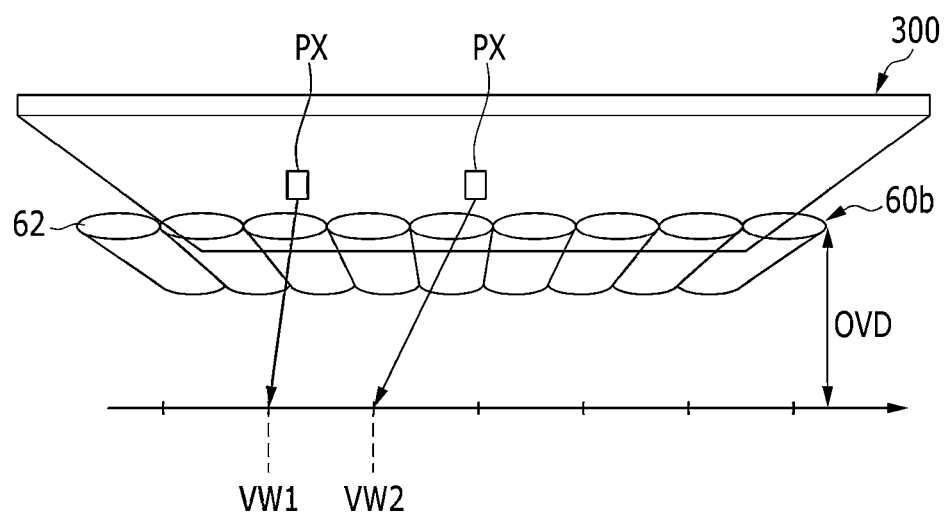
FIG. 21 is a diagram illustrating a method of displaying an autostereoscopic 3D image using a display device according to an embodiment of the present invention.

FIG. 21 is a diagram illustrating a method of displaying an autostereoscopic 3D image using a display device according to an embodiment of the present invention. FIG. 22 is a flowchart illustrating a method of controlling a frame rate based on an input image signal in a display device according to an embodiment of the present invention. The display device and the method may have one or more elements and features discussed above with references to one or more of FIGS. 1 to 20.

In an embodiment, the display device may be an autostereoscopic 3D image display device.

In an embodiment, the 3D image conversion member 60 may include an optical system 60b, such as a parallax barrier or a lens, in which light blocking parts and light transmitting parts are alternately arranged. FIG. 21 illustrates an example in which the optical system 60b includes a plurality of lenses 62.

The optical system 60b transmits light of an image displayed by each pixel PX of the display panel 300 to one or more of viewpoints VW1, VW2, etc. A distance from the optical system 60b to a point where an optimal 3D image is viewed is called an optimal viewing distance OVD. At different viewpoints VW1, VW2, etc. at the optimal viewing distance OVD, images displayed by different pixels PX may be viewed through the optical system 60b.

In an embodiment, a parallax barrier or lenses may function as the optical system 60b. The parallax barrier or lenses may be positioned between the display panel 300 and the viewer. The display panel 300 may alternately display images for the different viewpoints VW1, VW2, etc. in a horizontal direction. Different images may be provided to the different viewpoints VW1, VW2, etc. from the display panel 300 through the transmitting parts of the parallax barrier or the lenses.

For example, different pixels PX of the display panel 300 may display a left image targeting the first view point VW1 and a right eye image targeting the second view point VW2, and the optical system 60b may transmit suitable images to respective viewpoints VW1 and VW2. The left eye of the viewer may recognize the left eye image, and the right eye of the viewer may recognize the right eye image. The brain of the viewer may process the left eye image and the right eye image such that the viewer may perceive the images displayed by the display panel 300 as a 3D image.

Figure 22:
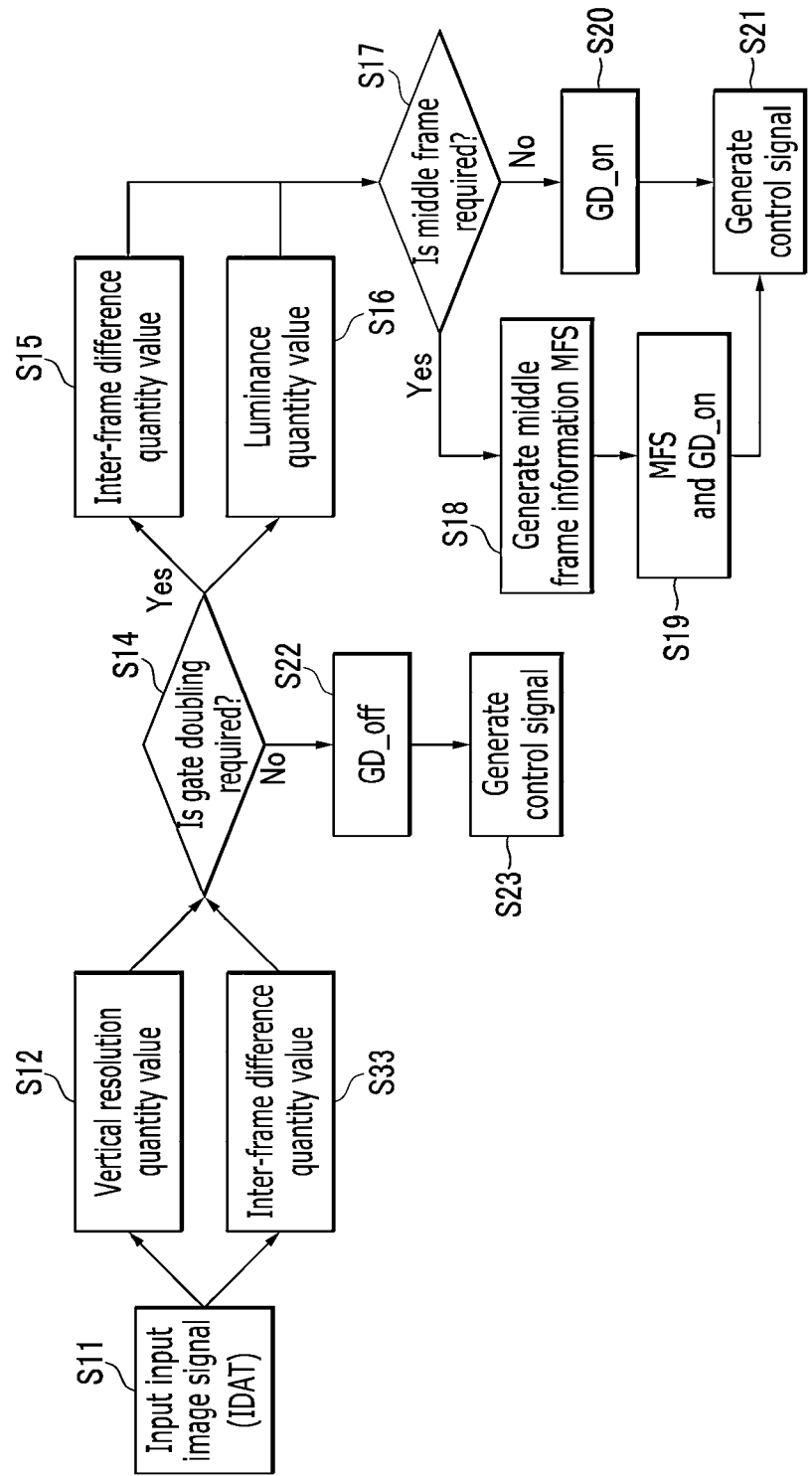
FIG. 22 is a flowchart illustrating a method of controlling a frame rate based on an input image signal in a display device according to an embodiment of the present invention.

FIG. 22 is a flowchart illustrating a method of controlling a frame rate based on an input image signal in an autostereoscopic 3D image display device according to an embodiment of the present invention. The method may include steps and features that are analogous to or identical to steps and features discussed with reference to one or more of FIGS. 1 to 20, e.g., FIG. 5. In an embodiment, referring to FIG. 22, when the frame rate determining unit 610 of the signal controller 600 or a frame rate determining unit (not illustrated) of the graphic controller 700 determines the frame rate based on the input image signal IDAT, the frame rate determining unit may quantify an inter-frame difference (in step S33) instead of quantifying the depth information. The quantifying of the inter-frame difference performed in step S33 may have elements and features that are identical to or analogous to elements and features of the step S15 implemented for quantifying the inter-frame difference described above. That is, an inter-frame difference quantity value that quantifies the inter-frame difference may be calculated using, for example, [Equation 3] described above.

In the autostereoscopic 3D image display device, since each pixel PX displays an image for a target view point for providing a 3D image or displays a 2D image regardless of the view point, for determining a suitable frame rate, quantifying the difference between adjacent frames of the input image signal IDAT for each coordinate of the display panel 300 (instead of quantifying the depth information) may be performed. In the step S14, if the inter-frame difference quantity value is larger than a predetermined reference value such that a response speed of the pixels PX needs to be increased and that cross talk between adjacent frames needs to be decreased, the frame rate determining unit may select double-on driving such that the gate driver 400 may perform the doubling-on driving scanning at the second frame rate F2; otherwise, the frame rate determining unit may select double-off driving such that the gate driver 400 may perform the doubling-off driving scanning at the first frame rate F1.

While this invention has been described in connection with what is presently considered to be practical embodiments, the invention is not limited to the disclosed embodiments. This invention is intended to cover various modifications and equivalent arrangements included within the spirit and scope of the appended claims.

DESCRIPTION OF SYMBOLS

| | |
|---|---|
| 60: 3D image conversion member | 60a: Shutter glasses |
| 60b: Optical system | 300: Display panel |
| 400: Gate driver | 500: Data driver |
| 600: Signal controller | 610: Frame rate determining unit |
| 620: Middle frame determining unit | 630: Middle frame generator |
| 650, 750: Frame rate controller | 660, 760: Frame memory |
| 670: Signal generator | 672: Control signal generator |
| 674: Output image signal generator | 700: Graphic controller |
| 900: Backlight | 950: Backlight controller |

What is claimed is:

1. A display device comprising:
   a frame rate determining unit configured to receive an input image signal and configured to select, based on the input image signal, one of a first frame rate and a second frame rate to be a selected frame rate, the second frame rate being equal to a natural number times the first frame rate, the natural number being greater than or equal to 2; and
   a display panel configured to display a first image according to at least a control signal generated based on the selected frame rate,
   wherein the frame rate determining unit is configured to calculate a vertical resolution quantity value by adding absolute values of gray differences of adjacent rows for the respective columns of the display panel based on the input image signal,
   wherein the frame rate determining unit is configured to select the first frame rate to be the selected frame rate if the vertical resolution quantity value is larger than a vertical resolution reference value, and
   wherein the frame rate determining unit is configured to select the second frame rate to be the selected frame rate if the vertical resolution quantity value is less than or equal to the vertical resolution reference value.

2. The display device of claim 1, further comprising:
   a signal controller configured to generate the control signal based on the selected frame rate, wherein the frame rate determining unit is included in a graphic controller that is external to the signal controller.

3. The display device of claim 2, further comprising:
   a first signal line electrically connected to each of the graphic controller and the signal controller and configured to transmit the input image signal from the graphic controller to the signal controller; and a second signal line insulated from the first signal line, electrically connected to each of the graphic controller and the signal controller, and configured to transmit an instruction signal from the graphic controller to the signal controller, the instruction signal being generated by the frame rate determining unit according to the selected frame rate.

4. A display device comprising:
a frame rate determining unit configured to receive an input image signal for a 3D mode and configured to select, based on the input image signal, one of a first frame rate and a second frame rate to be a selected frame rate, the second frame rate being equal to a natural number times the first frame rate, the natural number being greater than or equal to 2; and
a display panel configured to display a first image according to at least a control signal generated based on the selected frame rate,
wherein the frame rate determining unit is configured to calculate a depth information quantity value,
wherein the frame rate determining unit is configured to calculate the depth information quantity value by adding absolute values of gray differences of viewpoints according to the input image signal,
wherein the frame rate determining unit is configured to select the second frame rate to be the selected frame rate for the 3D mode if the depth information quantity value is larger than a depth information difference reference value, and
wherein the frame rate determining unit is configured to select the first frame rate to be the selected frame rate for the 3D mode if the depth information quantity value is less than or equal to the depth information reference value.

5. A display device comprising:
a frame rate determining unit configured to receive an input image signal for a 3D mode and configured to select, based on the input image signal, one of a first frame rate and a second frame rate to be a selected frame rate, the second frame rate being equal to a natural number times the first frame rate, the natural number being greater than or equal to 2;
a display panel configured to display a first image according to at least a control signal generated based on the selected frame rate; and
a backlight that includes a first light emitting block corresponding to a first portion of the display panel and includes a second light emitting block corresponding to a second portion of the display panel, the second portion of the display panel being configured to be positioned lower than the first portion of the display panel,
wherein when a present frame is driven according to the first frame rate and a next frame right after the present frame is driven according to the second frame rate, an on time period of the second light emitting block in the present frame is shorter than an on time period of the first light emitting block for the frame in the present frame, and
the input image signal of the present frame driven according to the first frame utilizes an entire area of the display panel.

6. A display device comprising:
a frame rate determining unit configured to receive an input image signal for a 3D mode and configured to select, based on the input image signal, one of a first frame rate and a second frame rate to be a selected frame rate, the second frame rate being equal to a natural number times the first frame rate, the natural number being greater than or equal to 2;
a display panel configured to display a first image according to at least a control signal generated based on the selected frame rate; and
a middle frame determining unit connected to the frame rate determining unit and configured to determine whether the display panel is to display any middle frame after displaying a previous image and before displaying the first image, wherein the previous image is displayed at a previous frame rate that is different from the selected frame rate; and
a middle frame information generator configured to generate middle frame information in response to a decision of the middle frame determining unit that a middle frame is required, the middle frame information specifying that a pulse of a first vertical start signal is delayed for a first hold period in displaying the middle frame.

7. The display device of claim 6, wherein the middle frame determining unit is configured to calculate an inter-frame difference quantity value by adding absolute values of gray differences of consecutive frames for pixels of the display panel according to the input image signal, and
wherein the middle frame determining unit is configured to determine that a middle frame is required if the inter-frame difference quantity value is in an inter-frame difference value range, and
wherein the middle frame determining unit is configured to determine that no middle frame is required if the inter-frame difference quantity value is outside the inter-frame difference value range.

8. The display device of claim 6,
wherein the middle frame determining unit is configured to calculate a frame luminance difference quantity value by calculating an absolute value of a difference between a sum of grays for a first frame and a sum of grays for a second frame according to the input image signal,
wherein the middle frame determining unit is configured to determine that no middle frame is required if the frame luminance quantity value is larger than a frame luminance difference reference value, and
wherein the middle frame determining unit is configured to determine that a middle frame is required if the frame luminance quantity value is less than or equal to the frame luminance difference reference value.

9. The display device of claim 6, wherein
the middle frame information further specifies that the display device is to display a dummy image for the first hold period.

10. The display device of claim 9,
wherein the display panel is configured to display the dummy image at the second frame rate after the first hold period, and
wherein the middle frame information further specifies that a pulse of a second vertical start signal is delayed for a second hold period after the display panel has started displaying the dummy image.

11. A display device comprising:
a frame rate determining unit configured to receive an input image signal for a 3D mode and configured to select, based on the input image signal, one of a first frame rate and a second frame rate to be a selected frame rate, the second frame rate being equal to a natural number times the first frame rate, the natural number being greater than or equal to 2;

a display panel configured to display a first image according to at least a control signal generated based on the selected frame rate;

a middle frame determining unit connected to the frame rate determining unit and configured to determine whether the display panel is to display any middle frame after displaying a previous image and before displaying the first image, wherein the previous image is displayed at a previous frame rate that is different from the selected frame rate; and a middle frame information generator configured to generate middle frame information in response to a decision of the middle frame determining unit that a middle frame is required, the middle frame information specifying that the display panel is to display a first portion of the middle frame at the first frame rate and that the display panel is to display a second portion of the middle frame at the second frame rate.

12. The display device of claim 11, wherein a first region of the display panel is configured to display the first portion of the middle frame, wherein a second region of the display panel is configured to display the second portion of the middle frame, and wherein the second region of the display panel is positioned lower than the first region of the display panel.

13. The display device of claim 11, wherein the middle frame information further specifies that a pulse of a vertical start signal is delayed for a hold period after the display panel has started displaying the middle frame.

14. A display device comprising:

a frame rate determining unit configured to receive an input image signal and configured to select, based on the input image signal, one of a first frame rate and a second frame rate to be a selected frame rate, the second frame rate being equal to a natural number times the first frame rate, the natural number being greater than or equal to 2;

a display panel configured to display a first image according to at least a control signal generated based on the selected frame rate;

a signal controller configured to generate the control signal based on the selected frame rate, wherein the frame rate determining unit is included in a graphic controller that is external to the signal controller; and a signal line electrically connected to each of the graphic controller and the signal controller, the signal line being configured to transmit the input image signal and an instruction signal from the graphic controller to the signal controller, wherein the instruction signal is generated by the frame rate determining unit according to the selected frame rate and is included in a vertical blank period signal to be transmitted, between input image signals, to the signal controller.

15. A method for operating a display device, the display device including a display panel, the method comprising:

receiving an input image signal that includes luminance information;

calculating a vertical resolution quantity value calculated by adding absolute values of gray differences of adjacent rows for columns of the display panel according to the input image signal;

based on the vertical resolution quantity value, selecting one of a first frame rate and a second frame rate to be a selected frame rate; and controlling the display panel to display a first image using at least a control signal generated according to the selected frame rate, wherein the second frame rate is equal to a natural number times the first frame rate, wherein the natural number is greater than or equal to 2, wherein if the vertical resolution quantity value is larger than a vertical resolution reference value, the selected frame rate is equal to the first frame rate, and wherein if the vertical resolution quantity value is less than or equal to the vertical resolution value, the selected frame rate is equal to the second frame rate.

16. A method for operating a display device, the display device including a display panel, the method comprising:

receiving an input image signal for a 3D mode that includes luminance information;

calculating a depth information quantity value by adding absolute values of gray differences of viewpoints according to the input image signal;

based on the depth information quantity value, selecting one of a first frame rate and a second frame rate to be a selected frame rate; and controlling the display panel to display a first image using at least a control signal generated according to the selected frame rate, wherein the second frame rate is equal to a natural number times the first frame rate, and wherein the natural number is greater than or equal to 2, wherein the second frame rate is selected to be the selected frame rate for the 3D mode if the depth information quantity value is larger than a depth information difference reference value, and wherein the first frame rate is selected to be the selected frame rate for the 3D mode if the depth information quantity value is less than or equal to the depth information reference value.

17. A method for operating a display device, the display device including a display panel, the method comprising:

receiving an input image signal for a 3D mode that includes luminance information;

based on the input image signal, selecting one of a first frame rate and a second frame rate to be a selected frame rate; and controlling the display panel to display a first image using at least a control signal generated according to the selected frame rate, wherein the second frame rate is equal to a natural number times the first frame rate, wherein the natural number is greater than or equal to 2, wherein the display device comprises a backlight that includes a first light emitting block corresponding to a first portion of the display panel and includes a second light emitting block corresponding to a second portion of the display panel, the second portion of the display panel being configured to be positioned lower than the first portion of the display panel when the display device is in operation, wherein when a present frame is driven according to the first frame rate and a next frame right after the present frame is driven according to the second frame rate, an on time period of the second light emitting block in the present frame is shorter than an on time period of the first light emitting block for the frame in the present frame, and the input image signal of the present frame driven according to the first frame utilizes an entire area of the display panel.

18. A method for operating a display device, the display device including a display panel, the method comprising:
receiving an input image signal that includes luminance information;
based on the input image signal, selecting one of a first frame rate and a second frame rate to be a selected frame rate; and
controlling the display panel to display a first image using at least a control signal generated according to the selected frame rate,
wherein the second frame rate is equal to a natural number times the first frame rate,
wherein the natural number is greater than or equal to 2,
wherein the method further comprises determining whether the display panel is to display any middle frame after displaying a previous image and before displaying the first image,
wherein the previous image is displayed at a previous frame rate that is different from the selected frame rate, and
wherein when a middle frame is implemented, a pulse of a first vertical start signal is delayed for a first hold period during display of the middle frame.

19. The method of claim 18, further comprising:
calculating an inter-frame difference quantity value by adding absolute values of consecutive frames for pixels of the display panel according to the input image signal;
determining that a middle frame is required if the inter-frame difference quantity value is in an inter-frame difference value range; and
determining that no middle frame is required if the inter-frame difference quantity value is outside the inter-frame difference value range.

20. The method of claim 18, further comprising:
calculating a frame luminance difference quantity value by calculating an absolute value of a difference between a sum of grays for the first frame and a sum of grays for the second frame according to the input image signal;
determining that no middle frame is required if the frame luminance quantity value is larger than a frame luminance difference reference value; and
determining that a middle frame is required if the frame luminance quantity value is less than or equal to the frame luminance difference reference value.

21. The method of claim 18,
wherein a dummy image is displayed for the first hold period.

22. The method of claim 21, wherein:
wherein the display panel displays the dummy image at the second frame rate after the first hold period, and
wherein a pulse of a second vertical start signal is delayed for a second hold period after the display panel has started displaying the dummy image.

23. A method for operating a display device, the display device including a display panel, the method comprising:
receiving an input image signal that includes luminance information;
based on the input image signal, selecting one of a first frame rate and a second frame rate to be a selected frame rate; and
controlling the display panel to display a first image using at least a control signal generated according to the selected frame rate,
wherein the second frame rate is equal to a natural number times the first frame rate,
wherein the natural number is greater than or equal to 2,
wherein the method further comprises determining whether the display panel is to display any middle frame after displaying a previous image and before displaying the first image,
wherein the previous image is displayed at a previous frame rate that is different from the selected frame rate, and
wherein when a middle frame is implemented,
wherein the display panel displays a first portion of the middle frame at the first frame rate, and
wherein the display panel displays a second portion of the middle frame at the second frame rate.

24. The method of claim 23,
wherein a first region of the display panel displays the first portion of the middle frame,
wherein a second region of the display panel displays the second portion of the middle frame, and
wherein the second region of the display panel is positioned lower than the first region of the display panel.

25. The method of claim 23, further comprising:
delaying a pulse of a vertical start signal for a hold period after the display panel has started displaying the middle frame.

26. A method for operating a display device, the display device including a display panel, the method comprising:
receiving an input image signal that includes luminance information;
based on the input image signal, selecting one of a first frame rate and a second frame rate to be a selected frame rate; and
controlling the display panel to display a first image using at least a control signal generated according to the selected frame rate,
wherein the second frame rate is equal to a natural number times the first frame rate,
wherein the natural number is greater than or equal to 2,
wherein the method further comprises:
generating an instruction signal according to the selected frame rate; and
transmitting the input image signal and an instruction signal through a same signal line,
wherein the instruction signal is included in a vertical blank period signal transmitted between input image signals.

* * * * *